United States Patent [19]

Horiya

[11] Patent Number: 4,809,086

[45] Date of Patent: Feb. 28, 1989

[54] INPUT SCANNING DEVICE

[75] Inventor: Keiichi Horiya, Numazu, Japan

[73] Assignee: Tokyo Electric Co., Ltd., Tokyo, Japan

[21] Appl. No.: 85,650

[22] Filed: Aug. 13, 1987

[51] Int. Cl.$^4$ .............................................. H04N 1/10
[52] U.S. Cl. .................................. 358/293; 358/280; 358/285
[58] Field of Search ............... 358/293, 294, 288, 284, 358/282, 256, 280; 280/578

[56] References Cited

U.S. PATENT DOCUMENTS

| | | | |
|---|---|---|---|
| 4,240,117 | 12/1980 | Wellendorf et al. | 358/296 |
| 4,240,118 | 12/1980 | Wellendorf et al. | 358/296 |
| 4,245,259 | 1/1981 | Pick | 358/285 |
| 4,268,870 | 5/1981 | Kitamura et al. | 358/296 |
| 4,280,145 | 7/1981 | Norrell | 358/289 |
| 4,296,441 | 10/1981 | Ogasawara | 358/293 |
| 4,402,017 | 8/1983 | Takei | 358/293 |
| 4,486,786 | 12/1984 | Sato et al. | 358/293 |
| 4,506,302 | 3/1985 | Kurata | 358/293 |
| 4,525,748 | 1/1985 | Carbone | 358/286 |
| 4,553,174 | 11/1985 | Moriguchi et al. | 358/285 |
| 4,558,372 | 12/1985 | Culter | 358/264 |
| 4,567,585 | 1/1986 | Gelbart | 369/97 |
| 4,588,373 | 5/1986 | Piasencia | 358/288 |
| 4,675,533 | 6/1987 | Shimizu | 358/293 |
| 4,692,812 | 9/1987 | Hirahara et al. | 358/293 |

Primary Examiner—Edward L. Coles, Sr.
Attorney, Agent, or Firm—Frishauf, Holtz, Goodman & Woodward

[57] ABSTRACT

A scanning device comprises a paper holding member for holding paper to be scanned, paper feeder for continuously feeding the paper in a first direction at substantially a constant speed, scanning unit for scanning the paper in a second direction substantially perpendicular to the first direction, scanning areas scanned in two successive scanning cycles by the scanning unit being partly overlapped on each other, memory for storing data supplied from the scanning unit, and control unit for deriving column data each formed of a plurality of bits from the scanning unit at a regular interval for each row and sequentially storing the derived column data into the memory, detecting the overlapped bit number between two successive scanned data by comparing each column data of one of the two successive scanned data and corresponding column data of the other scanned data, and cancelling the detected number of overlapped bits from each column data of one of the two successive scanned areas.

12 Claims, 28 Drawing Sheets

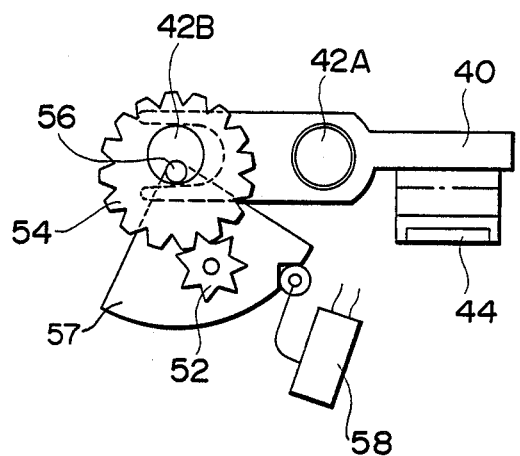
F I G. 3
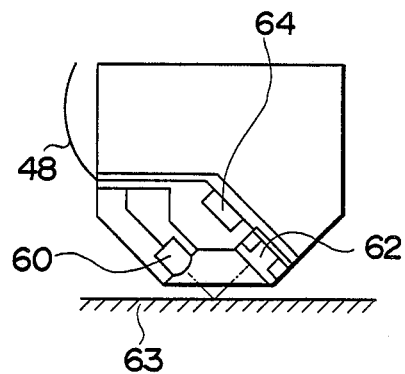
F I G. 4

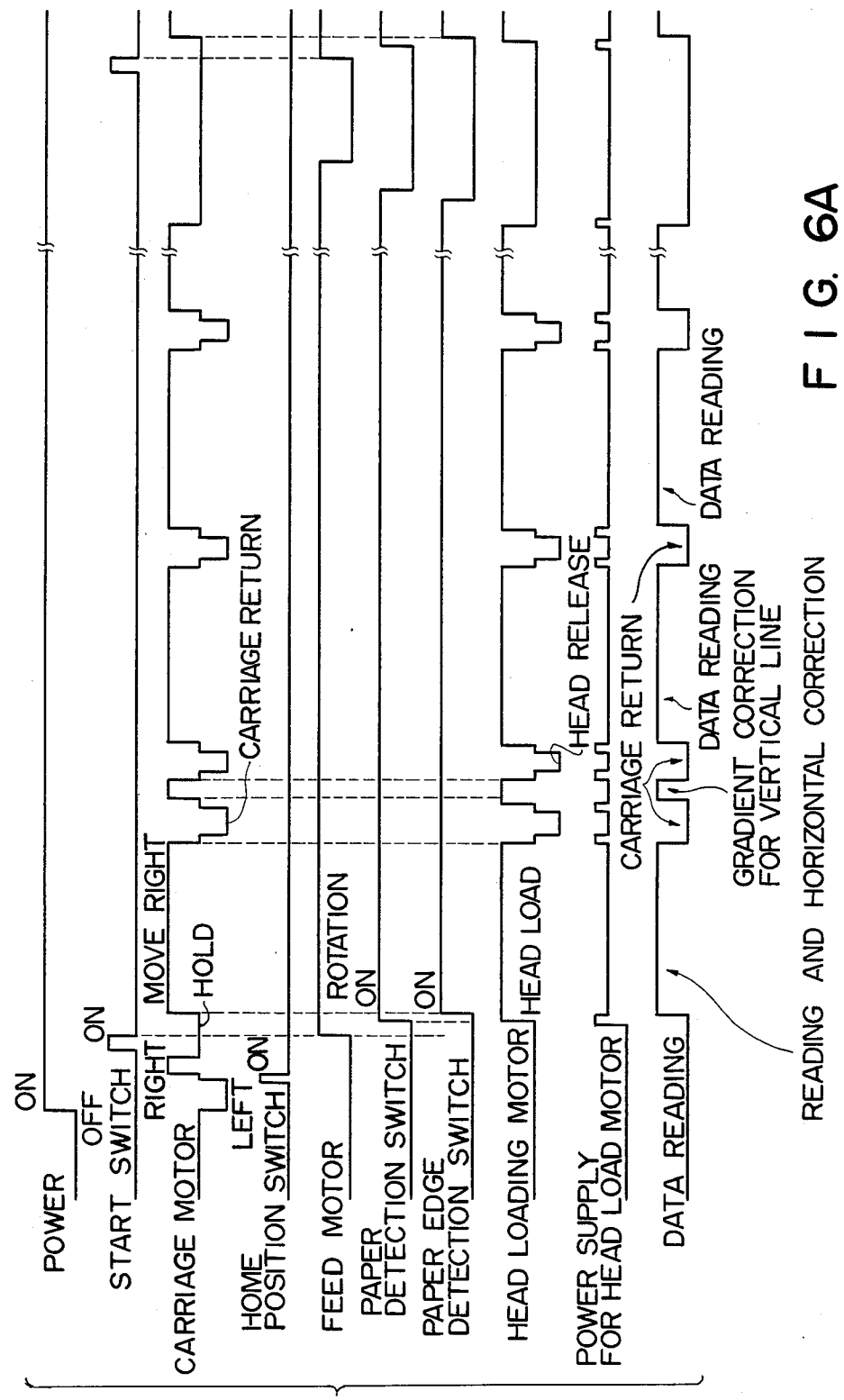

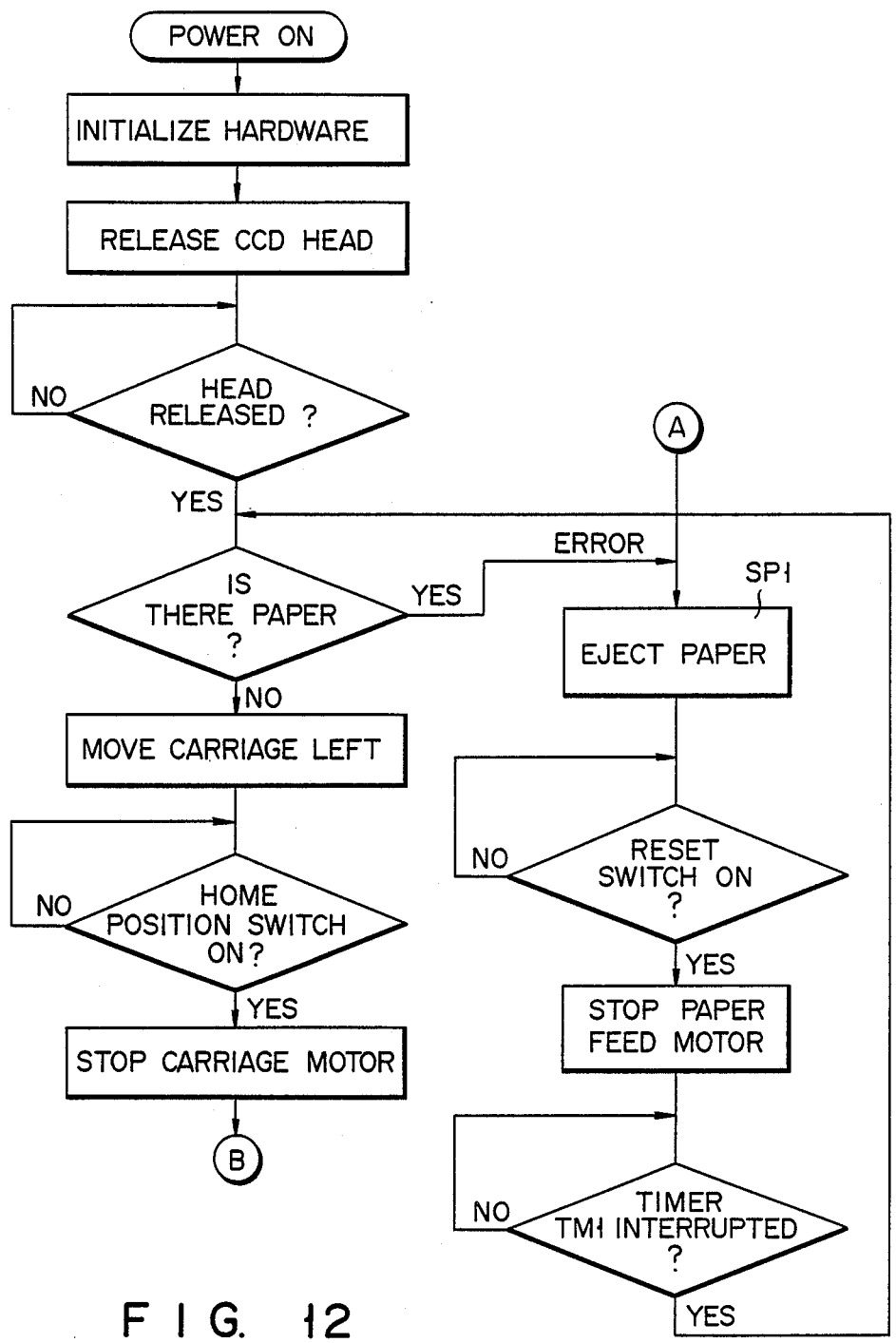
F I G. 12

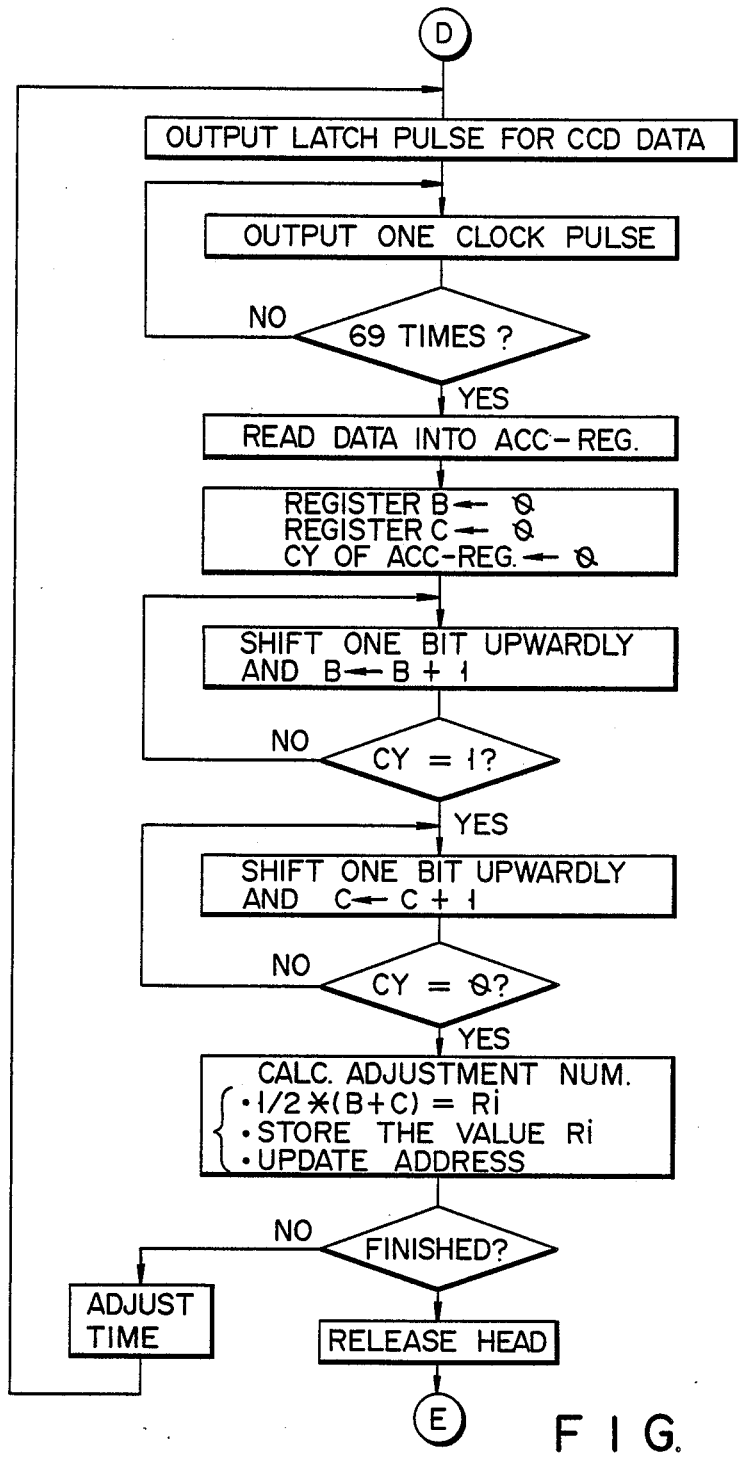
F I G. 15

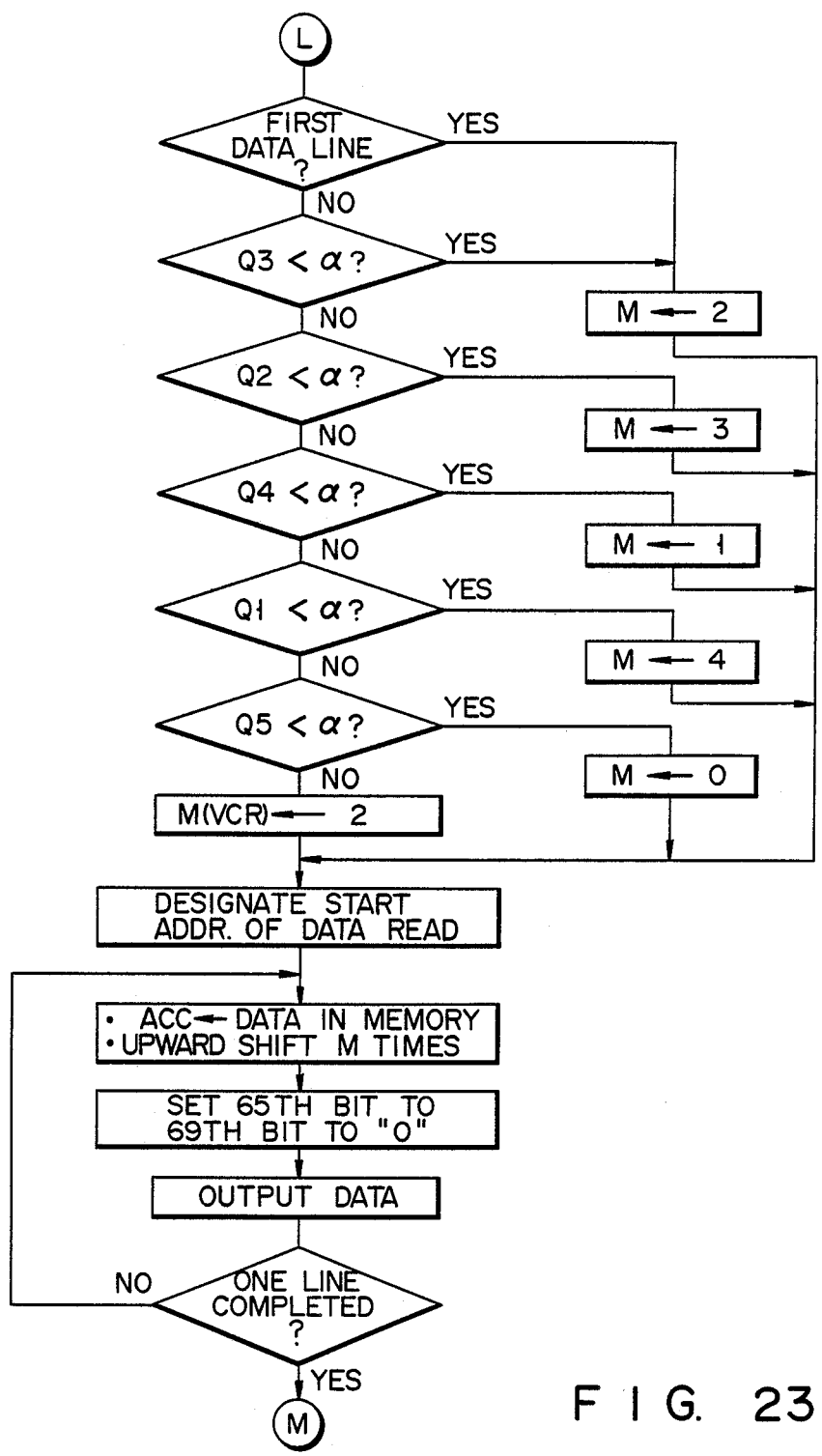
F I G. 23

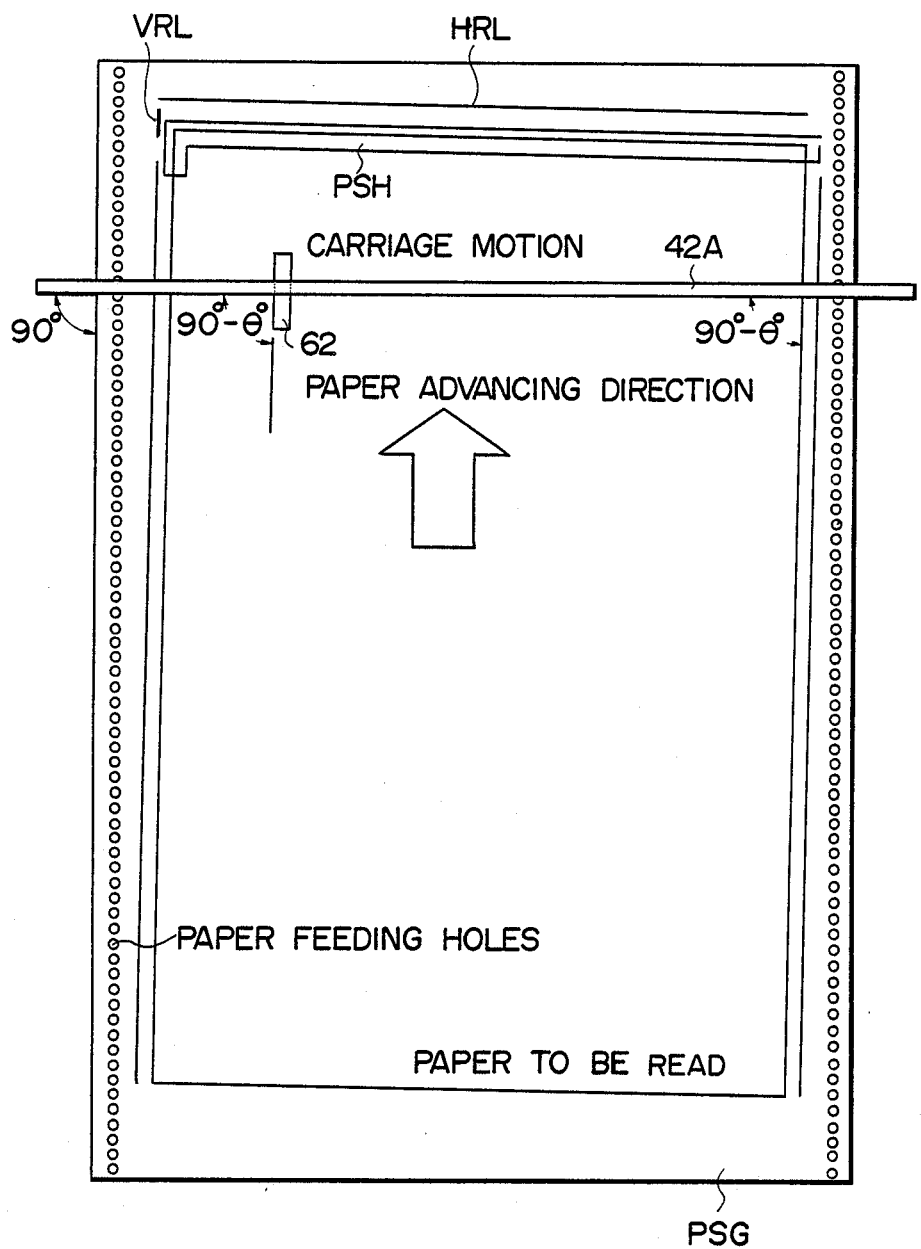
F I G. 26

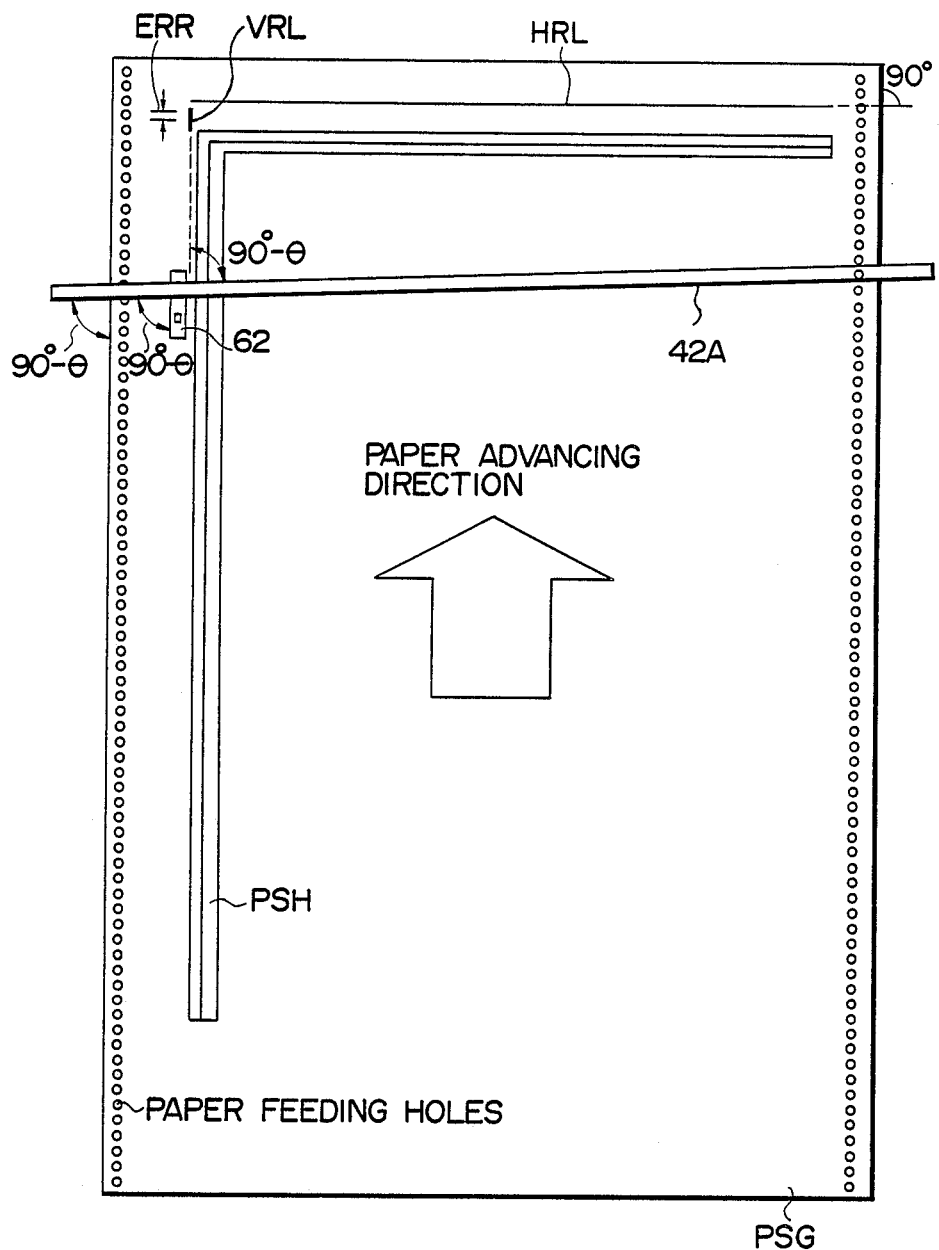
F I G. 27

INPUT SCANNING DEVICE

BACKGROUND OF THE INVENTION

The present invention relates to a serial reading type input scanning device.

Although various input scanners are conventionally known, typical examples are (1) a drum scanner, (2) a sensor array scanner, (3) a solid-state camera, and (4) a serial scanner. Therefore, these four types of scanners will be briefly described below.

(1) Drum Scanner:

In this scanner, paper to be read is adhered to a rotary drum, the drum is rotated, and a single reading sensor is slowly moved along the surface of the drum and parallel to a rotating shaft thereof, thereby reading an image. However, since an error between reading rows adversely affects every time the drum rotates, large units such as a drum must be manufactured with high accuracy, naturally resulting in high cost. In addition, a reading speed is low because a single sensor is used.

(2) Sensor Array Scanner:

In this scanner, optical reading sensors such as CCDs are arranged in a row direction, and a sheet of paper is continuously fed, thereby reading data of a sensor width at a time. This scanner is mainly used as a reading section of a facsimile device or the like and has many advantages in terms of operability (especially a reading speed). However, if a sensor width is increased, a problem of uniformity of sensors or reliability thereof (a single broken element leads to malfunction) is posed, resulting in a reduction in the yield and high cost.

(3) Solid-State Camera:

In this scanner, an image is projected onto sensors such as CCDs arranged in a matrix manner and electrically read in horizontal and vertical directions, thereby reading the image. This scanner is suitable for catching the entire image, but is not suitable for graphic reading (e.g. drawings) which requires high accuracy because of distortion of an image and inaccuracy caused by its structure.

(4) Serial Scanner:

In this scanner, sensing elements of one column move in a direction perpendicular to a feeding direction of paper to be read and sequentially read data, the paper is fed by one row after the one row is read, and after the paper is fed, the next row is then read. This scanner is not suitable for high accuracy reading such as graphic reading since a blank or an overlapped portion tends to be formed between read rows. In addition, since there are many movable portions, read data differs from source data in a large device.

The serial scanner has a simple mechanism as compared with the former three scanners but is more or less poor in accuracy.

On the other hand, a personal computer in recent years has been significantly improved in functions and widely used in a field of a work station of computer aided design (CAD). In addition, output devices, e.g., a printer and a plotter, have been significantly developed. However, input devices, e.g., a keyboard, a tablet, and a mouse, are still manually operated. Therefore, in order to automatically input information, strong demand has arisen for development of a low cost input scanner with high accuracy.

SUMMARY OF THE INVENTION

It is, therefore, an object of the present invention to provide an input scanning device with high reliability and high accuracy.

The above object of the present invention is achieved by an input scanning device comprising paper holding means for holding paper to be scanned, paper feeding means for continuously feeding the paper in a first direction at substantially a constant speed, scanning means for scanning the paper in a second direction substantially perpendicular to the first direction, scanned areas scanned in two successive scanning cycles by said scanning means being partly overlapped on each other, memory means for storing data supplied from said scanning means, and control means for deriving column data each formed of a plurality of bits from said scanning means at a regular interval for each column and sequentially storing the derived column data into said memory means, detecting the overlapped bit number between two successive scanned data by comparing each column data of one of the two successive scanned data and corresponding column data of the other scanned data, and cancelling the detected number of overlapped bits from each column data of one of the two successive scanned areas.

According to the present invention, the width of a region read by an optical reading sensor in a columndirection is set larger than a feeding amount of paper in one reading cycle. Therefore, regions of two rows which are read in two successive reading cycles overlap with each other, an amount of an overlapped portion is detected, and this detected amount is removed from the region of one of the two rows. For this reason, no blank or overlapped portion is generated between regions which are successively read.

BRIEF DESCRIPTION OF THE DRAWINGS

FIGS. 3 and 4 respectively show a head load mechanism and a sensor head section;

FIGS. 6A to 6C are timing charts showing the operation of the FIG. 2 circuit;

FIGS. 12 to 24 are flow charts fully explaining the operation of the FIG. 2 circuit;

FIGS. 26 and 27 are modifications of the paper holding section shown in FIG. 8.

DETAILED DESCRIPTION OF THE PREFERRED EMBODIMENT

Figure 1:
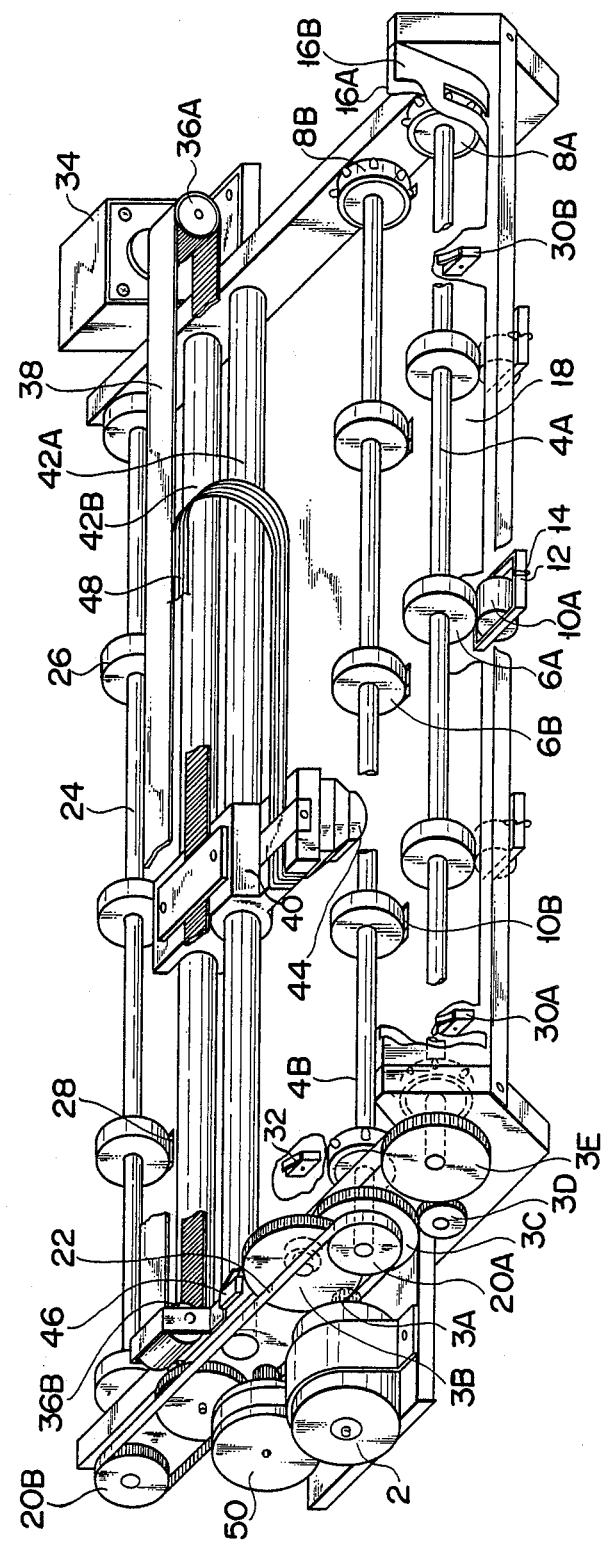
FIG. 1 shows a mechanism of a scanning device according to one embodiment of this invention.

FIGS. 1 and 2 respectively show a mechanism and a circuit of an input scanning device according to one embodiment of the present invention. This reading mechanism is mainly divided into a reading paper feeding section, a carriage feeding section, and a head load section. Note that a sensor head section for optically reading information on paper is mounted on the carriage feeding section. Arrangements and operations of the above three sections and the sensor head section will be briefly described below.

(1) Reading Paper Feeding Section

When start switch SWS (FIG. 2) is turned on by an operator and a series of reading operations are started, pulse motor 2 rotates, this rotation is transmitted by gear mechanism 3, and paper feeding roller shafts 4A and 4B rotate in a paper traction direction. Three paper feeding rollers 6A and three paper feeding rollers 6B for feeding paper by friction are respectively mounted on shafts 4A and 4B, and four pin feed tractors 8A and 8B, pins of which hook guide holes of paper and correctly feed the paper, are mounted thereon at both ends. Rollers 6A and 6B are respectively paired with pinch rollers 10A and 10B provided below rollers 6A and 6B and adapted to abut against rollers 6A and 6B. Paper to be fed is sandwiched between rollers 6A and 6B and rollers 10A and 10B and correctly fed by rotation of rollers 6A and 6B. A rotating shaft of each of rollers 6A and 6B is supported by paper feeding pinch roller shaft support metal piece 12, and one end of metal piece 12 is fixed and the other end thereof is biased upward by spring 14. Those portions of paper insertion guide plates 16A and 16B and frame 18 through which the pins of tractors 8A and 8B pass are removed, thereby permitting free rotation of tractors 8A and 8B. Rollers 6A and 6B together with tractors 8A and 8B serve to feed paper without meandering while they cooperate to cause traction of paper. Rotation of rollers 6A and 6B is transmitted to paper feeding roller shaft 24 through a pair of pulleys 20A and 20B and timing belt 22, thereby rotating five paper feeding rollers 26 and pinch rollers 28 which abut against rollers 26. Rollers 26 discharge paper which is fed by the pair of tractors 8B and three rollers 6B. Structures of rollers 26 and 28 are similar to those of rollers 6A and 6B and rollers 10A and 10B described above. Paper inserted by an operator is hooked and fed by right and left tractors 8A, and a leading edge thereof drives paper insertion detection switches 30A and 30B. Two switches 30A and 30B are mounted on the frame so as to operate substantially at the same time when the paper is correctly inserted. That is, an actuator or lever of each switch projects upward from a window formed in frame 18 and can be urged by the paper, thereby operating the switch. Paper edge detection switch 32 having the same structure and mounted at the left side between shafts 4B and 24 operates when the edge of paper reaches or passes this position. Switch 32 supplies a reading start instruction and a paper edge signal.

(2) Carriage Feeding Mechanism

During data reading, rotation of carriage feeding motor 34 is transmitted to timing belt 38 through pulleys 36A and 36B. Carriage 40 is fixed to a portion of belt 38 and is linearly moved along with rotation of motor 34. When data is to be read, carriage 40 is guided by two shafts 42A and 42B and is moved from left to right, and when reading of one row is completed, carriage 40 returns to the left end for the next reading cycle. Sensor head section 44 for reading data is mounted below carriage 40. When a head (sensor) load mechanism is operated, sensor section 44 abuts against the paper and reads it. Home position detection switch 46 sets the home position of carriage 40. When carriage 40 approaches the left end, an actuator of switch 46 is urged by carriage 40 so that switch 46 is operated. Flexible cable 48 for exchanging signals between sensor section 44 and a control circuit (FIG. 2) is connected to carriage 40 and displaces in correspondence to right and left movements thereof.

(3) Head Load Mechanism

The head load mechanism is a mechanism for causing sensor section 44 to abut against paper to be read during reading. In this mechanism, eccentric shaft 42B is rotated by forward/reverse rotation of stepping motor 50 so that a rear portion of carriage 40 guided by shaft 42B is vertically moved, thereby pivoting sensor section 44 about shaft 42B and vertically moving it. This operation will be described below with reference to FIG. 3. Rotation of head load motor 50 is transmitted to gear 54 through gear 52 mounted on a shaft of motor 50. Gear 54 is mounted on rotation shaft 56, rotation shaft 56 is eccentrically mounted on shaft 42B. By rotation of shaft 42B, carriage 40 is pivoted about carriage guide shaft 42A, so that sensor section 44 is moved upward or downward. In this case, switch actuating cam 57 is driven in response to rotation of shaft 42B and controls a switching state of head load detection switch 58.

(4) Sensor Section

Sensor section 44 mounted on the distal end lower portion of carriage 40 will be described with reference to FIG. 4. LED array 60 and CCD array 62 are mounted on the lower portion of sensor section 44 so that light emitted from each LED of array 60 is incident on paper surface 63 at an incident angle as near as 90° with respect to surface 63 and light reflected from surface 63 is radiated otto the surface of corresponding CCD sensor at a right angle. Each CCD sensor of array 62 changes an output voltage in accordance with a black/white level of a portion of surface 63 on which light is incident. This signal is amplified by LSI 64, converted into a serial digital signal, and then supplied to a control circuit section (FIG. 2).

Figure 2A:
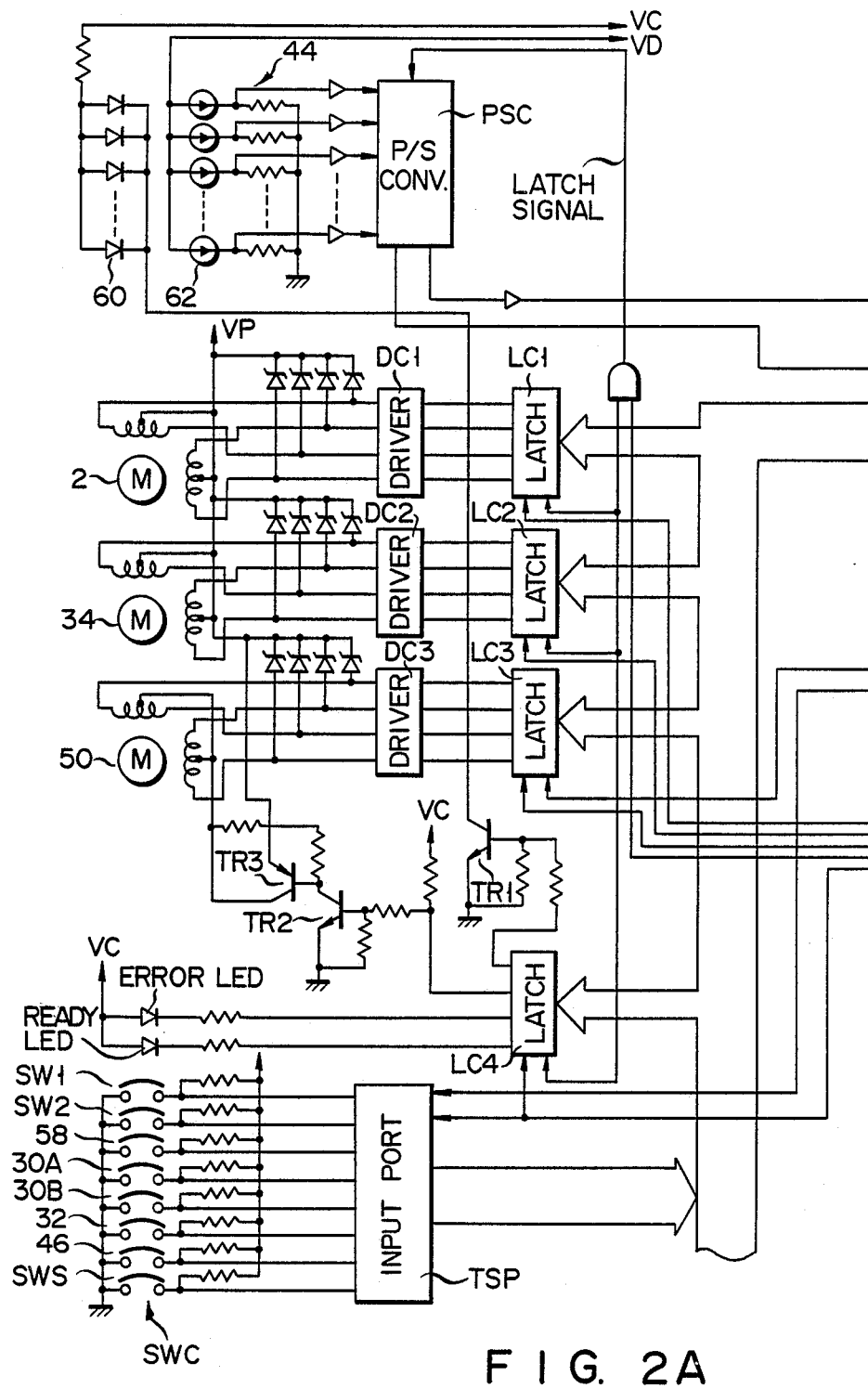
FIGS. 2A and 2B are circuit diagrams of the scanning device.
Figure 2B:
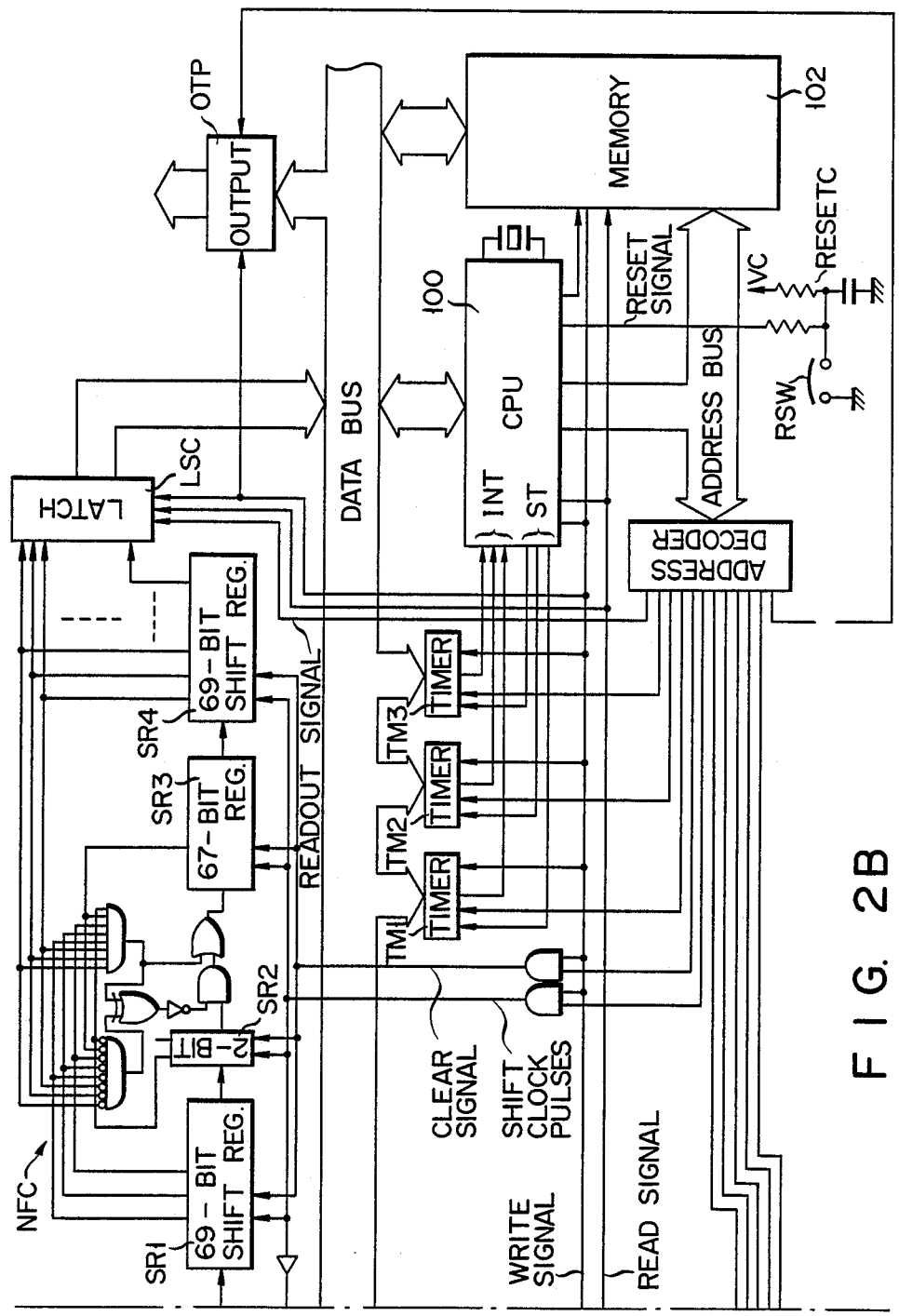

FIGS. 2A and 2B show an electrical circuit of the input scanning device according to the embodiment of the present invention. The input reading circuit includes CPU 100, memory device 102 connected to CPU 100 through a data bus and having a ROM and a RAM, timers TM1 to TM3, latch circuits LC1 to LC5, and tristate input port TSP and output port OTP. Circuits LC1 to LC3 are connected to driver circuits DC1 to DC3 respectively for driving paper feeding stepping motor 2, carriage feeding stepping motor 34, and head load stepping motor 50. Latch circuit LC4 is connected to an error LED and a ready LED, and is also connected to transistor TR1 for driving LED array 60 and to transistors TR2 and TR3 for selecting a drive voltage of motor 50. Latch circuit LC5 is connected to filter circuit NFC for receiving a serial output from parallel/serial converter PSC for converting 69-bit parallel input from CCD array 62 into a serial output. Input port TSP is connected to switching circuit SWC including paper size switches SW1 and SW2, head load detection switch 58, paper insertion switches 30A and 30B, paper edge detection switch 32, home position detection switch 46, and start switch SWS.

An address signal from CPU 100 is decoded into a selection signal for designating the above latch circuits, input and output ports, and timer circuits, and is combined with a read or write signal to read data from the above latch circuits, input and output ports, and timer circuits and to supply data thereto. An ANDed signal of this decoded address signal and the write signal is used to latch the 69-bit parallel output from array 62 in converter PSC, to shift the serial output from converter PSC through shift registers SR1 to SR4 in circuit NFC, or to clear registers SR1 to SR4.

Figure 5A:
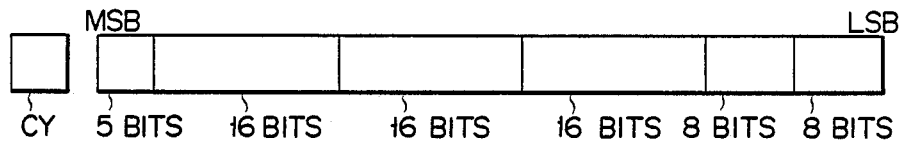
FIGS. 5A and 5B are memory maps of a memory used in the FIG. 2 circuit.
Figure 5B:
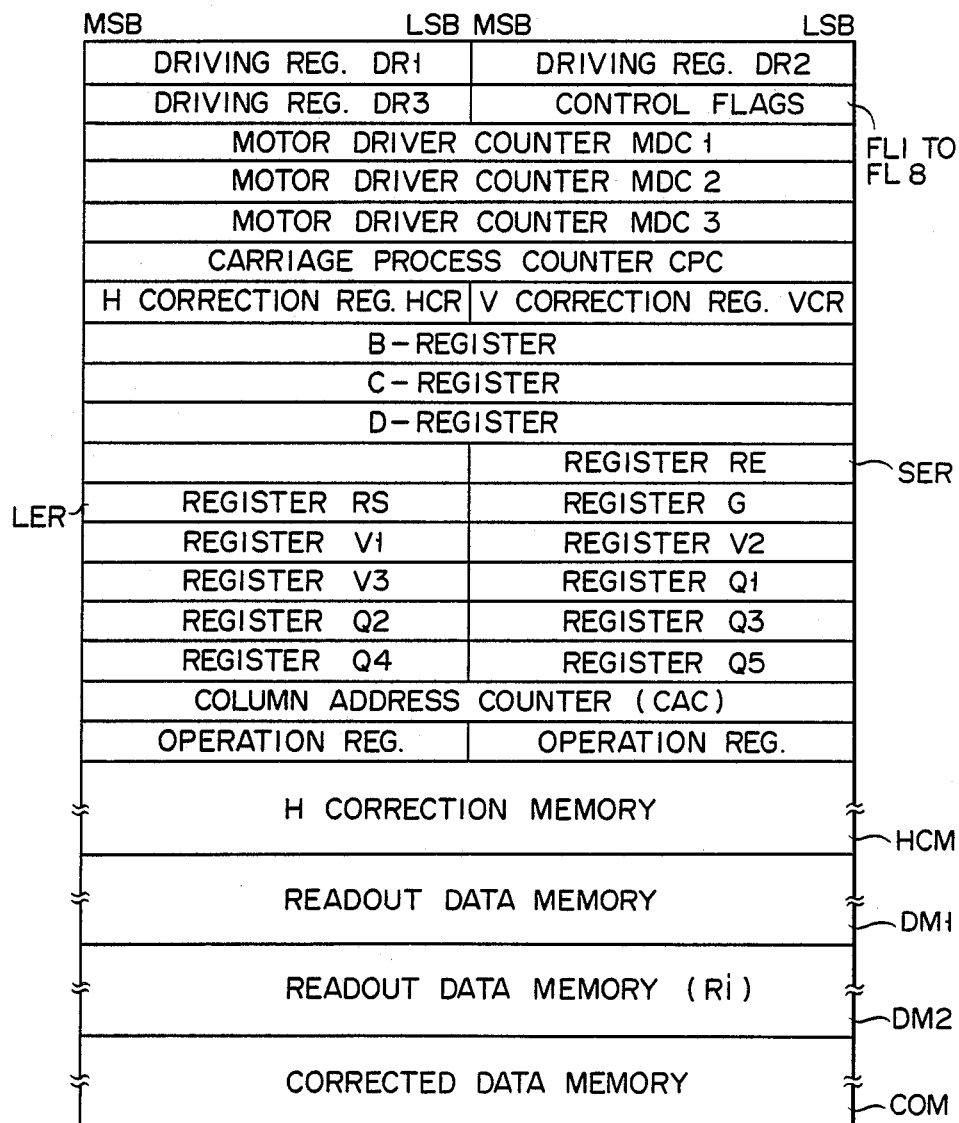

FIGS. 5A and 5B show memory maps of memory 102 of FIG. 2. FIG. 5A shows a 69-bit ACC-register. FIG. 5B includes: 8-bit motor driving phase registers DR1 to DR3 for storing energization data, upper four bits of which are used to drive head load motor 50, paper feed motor 2, add carriage motor 34; motor control flags FL1 to FL8; 16-bit motor driver counters MDC1 to MDC3 for counting shifts of motors 50, 2, and 34; 16-bit carriage process counter CPC for counting a process distance of carriage 40; horizontal and vertical correction registers HCR and VCR; B-, C-, and D-registers, operation registers and various registers RE, RS, G, V1 to V3, and Q1 to Q5; horizontal correction memory HCM; first and second readout data memories DM1 and DM2; and corrected data memory CDM. Note that during a data reading operation, memories DM1 and DM2 are alternately designated to store two successive scanning line data.

Figure 6B:
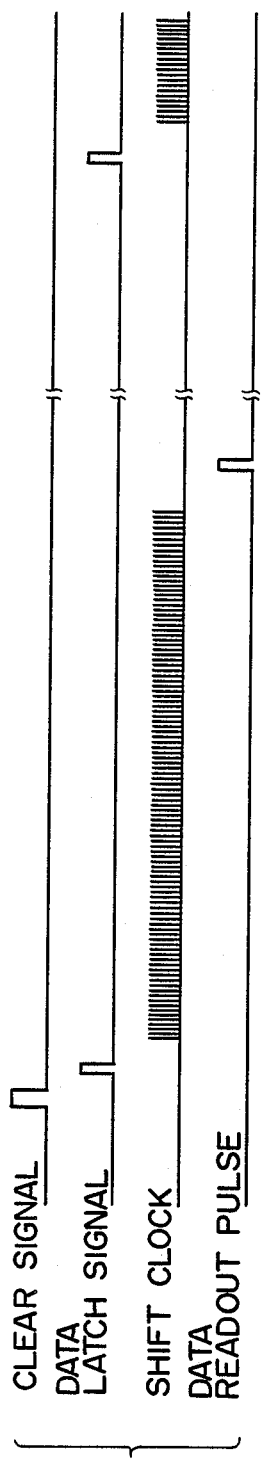
Figure 6C:
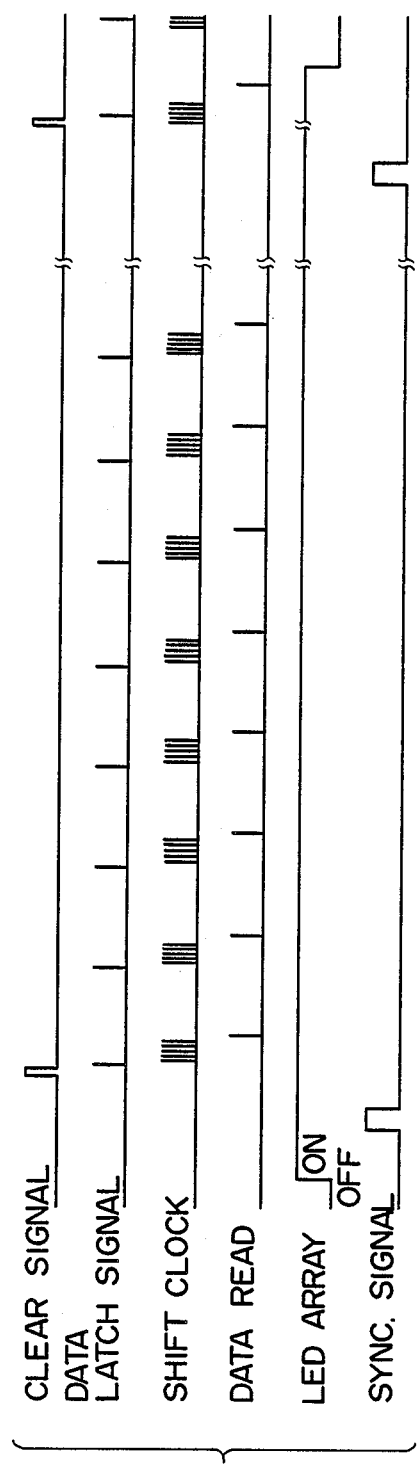

As shown in FIG. 6A, when a power switch is turned on, a reset signal is supplied to CPU 100 from reset circuit RESETC which is operated at the same time as the turn on of the power switch, so that CPU 100 performs initialization and a program starts running from a start address. Subsequently, CPU 100 causes carriage 40 to move to the home position by a known method. This operation can be performed by sending drive data to circuit LC2 for motor 34, as shown in FIG. 6A. Drive data for moving carriage 40 to the left is sent to circuit LC2 first, and it is confirmed that switch 46 has turned on through the input port. Then, drive data for moving carriage 40 to the right is sent to circuit LC2 to move carriage 40 by a predetermined distance, and this position is set to be a home position. Interval timer TM2 determines a switching timing of a rotation signal of motor 34, and CPU 100 sets time data in timer TM2 through data bus before the timer starts. When the preset time has elapsed after timer TM2 starts, timer TM2 supplies an interrupt signal to CPU 100. By this interruption, drive software for motor 34 is activated to rotate motor 34. Timer TM2 starts every time the time data is input, and repeats the above operation. Similarly, motors 2 and 50 are driven as shown in FIG. 6A. After carriage 40 is moved to the home position and held thereat, CPU 100 checks the state of switch SWS through input port TSP. If switch SWS is ON, CPU 100 causes rotation of motor 2 using interval timer TM1 in the above manner, and then checks the states of switches 30A, 30B, and 32 through input port TSP. In addition, in accordance with the states of switches SW1 and SW2, CPU 100 sets a paper width, and then executes a reading operation including correction. In the reading operation, CPU 100 first causes carriage 40 to move from left to right, and at the same time, executes a head load operation. The head load operation is executed by rotation of motor 50. CPU 100 rotates motor 50 by the predetermined number of times to load a head or sensor section 44, i.e., causes sensor section 44 to abut against the paper surface and keeps motor 50 in a holding state while an energization phase of motor 50 upon completion of load is kept on. When reading is completed, CPU 100 causes reverse rotation of motor 50 to release the head or sensor section 44. As shown in FIG. 6A, CPU 100 switches voltages through circuits LC4 and transistors TR2 and TR3 so that a high voltage is applied during activation and rotation of the motors and that a low voltage is applied during the holding state. For example, when an output from circuit LC4 is set to "1", transistors TR2 and TR3 are turned on, and a high voltage is applied to motor 50. During movement of the carriage, CPU 100 latches an output voltage from array 62 in converter PSC every predetermined cycle, sequentially shifts the latched data 69 (the number of CCDs in array 62)×3 times in an initial cycle and 69 times from the next cycle, and fetches the serial data through latch circuit or tristate input port LC5 each time the data is shifted 69 times. By repeating this operation, data reading is performed. In this data reading operation, as shown in FIGS. 6B and 6C, CPU 100 clears shift registers of noise filter circuit NFC by a clear signal before reading of each column is started, and supplies a latch signal to converter PSC so that converter PSC latches the readout data from array 62. Then, CPU 100 supplies shift clock pulses to converter PSC and circuit NFC to shift the data in converter PSC to the above shift registers. The readout data signal is supplied to circuit LC5 every time 69 shift clock pulses are generated, the data from circuit NFC is latched in circuit LC5, and CPU 100 reads out the latched data and alternately set them in data memories DM1 and DM2.

Note that as shown in FIG. 6C, during the data reading operation, array 60 is held in an active state. Before reading of each scanning line is started, a rotation timer start signal for carriage motor 34 is synchronized with a feed motor signal in the interrupt processing routine. Circuit NFC shown in FIG. 2 is a 3×3 bit noise filter in which an isolated single dot is eliminated. That is, information of a central bit of a given 3×3 bit group constituted by input data of successive columns is converted into the same data as that of 8 bits surrounding the central bit. The priority order of interrupt signals to CPU 100 by outputs from three timers TM1 to TM3 is paper feeding motor interval timer TM1, carriage feeding interval timer TM2, and head load interval timer TM3 in the order named, and all these interrupt signals are used to set times for motors 2, 34, and 50, respectively. The data thus read out and corrected are output from output port OTP to external equipment.

Figure 7:
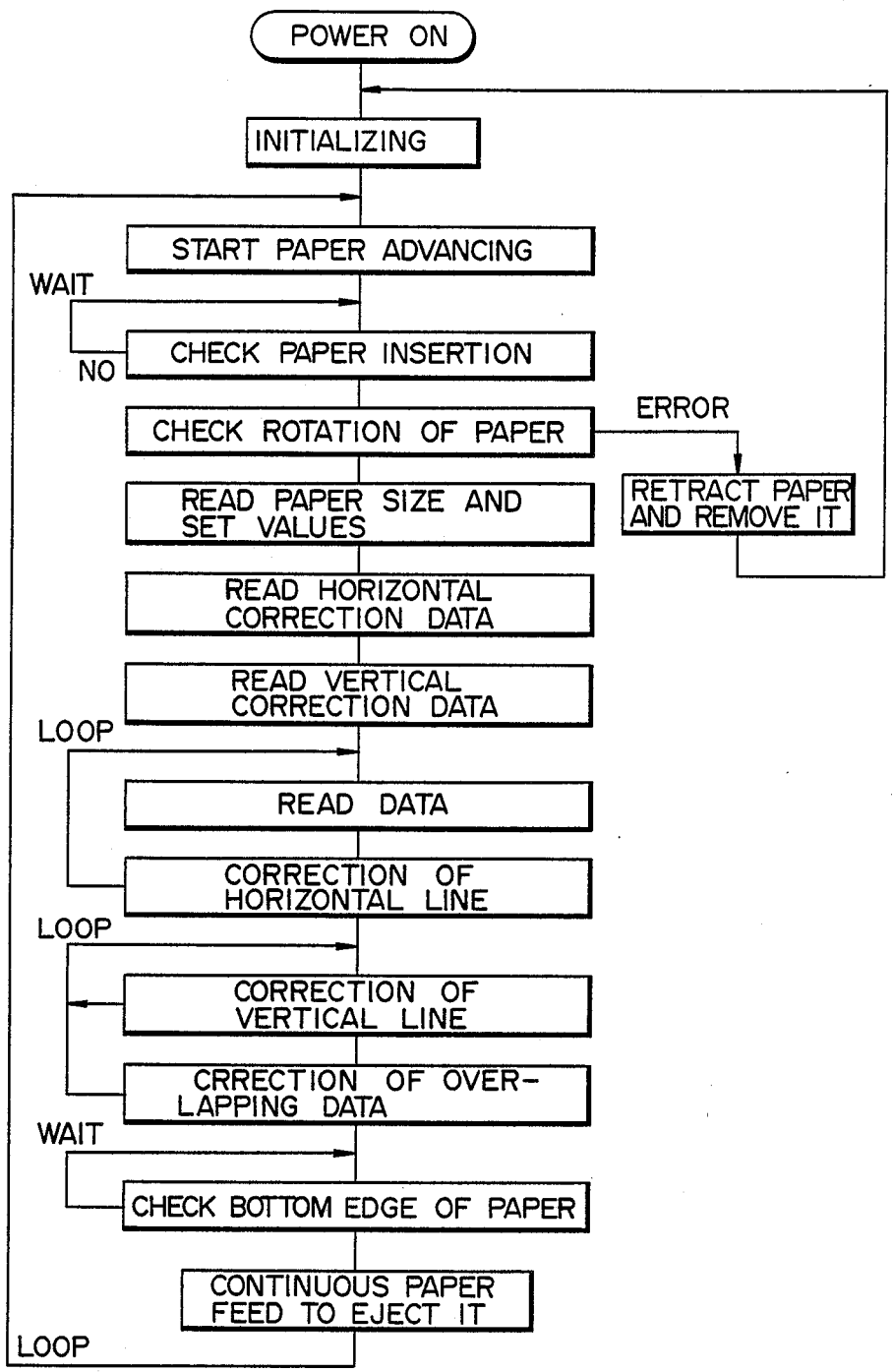
FIG. 7 is a flow chart showing the entire operation of the FIG. 2 circuit.

An operation of the input scanning device shown in FIG. 2 will be described below with reference to a general flow chart shown in FIG. 7. At first, when the power switch is turned on, hardware and software are initialized. By this initialization, carriage 40 is moved to the home position as described above. In this case, by rotation of motor 34, a series of operations are performed such that carriage 40 is moved to the left first, switch 46 is turned on, and then carriage 40 is moved to the right. If switch SWS is depressed, motor 2 starts rotation and waits for insertion of paper. When insertion of paper is detected by switches 30A and 30B, timings at which two switches 30A and 30B are turned on are compared with each other. If the two switches are turned on substantially simultaneously, the paper is continuously fed, and at the same time, a paper size is set. A movement range of the carriage is determined in accordance with this preset value and is set in a memory. If a time lag of a predetermined value or more occurs between the timings at which the two switches are turned on, CPU 100 drives the error LED, causes reverse rotation of motor 2 to discharge the paper in a reverse direction, and then returns to initialization. If the paper is correctly inserted, switch 32 is then turned on, and it is confirmed that the paper advances to a readable position. In this case, reading for horizontal correction is performed as the first reading cycle to form horizontal correction data, and reading for vertical correction is then performed as the second reading cycle to form vertical correction data. Thereafter, data to be read is read out throughout a preset row width and successively by a paper length. As described above with reference to the hardware, reading is performed as follows. That is, carriage 40 is moved from left to right while array 60 is loaded on or brought into light contact with the paper, and carriage 40 is then moved to the right with array 60 turned on to read data every predetermined cycle. After one row is read, array 60 is released or removed from the paper, carriage 40 is returned to the left end (home position) at a high speed, and this reading operation is repeated in synchronism with rotation of motor 2. During this reading, horizontal correction of the read data is performed by the above-mentioned horizontal correction data, and during carriage return, vertical correction of the read and stored data is performed on the basis of the above-mentioned vertical correction data and interrow correction is performed on the basis of calculations during reading. Reading and correction are performed throughout paper by a preset paper length, and read data is stored and then supplied as an output to an external equipment. If CPU 100 confirms that the edge of the inserted paper opens switch 32 after the data is output, CPU 100 causes discharge of the paper at a high speed. After the paper is discharged, the process is changed to the step of waiting for ON of the start switch. All operations are performed as briefly described above. It is important that energization phase switching cycles of motor 2 are counted and synchronization of motors 2 and 34 is performed every predetermined switching cycles. The most important points of the present invention, i.e., horizontal correction, vertical correction, and interrow correction will be described below. Horizontal correction and vertical correction are performed by reading a line serving as a reference and correcting desired read data to be corrected on the basis of the reference read data. However, interrow correction is performed by correcting on the basis of actually read data.

Figure 8:
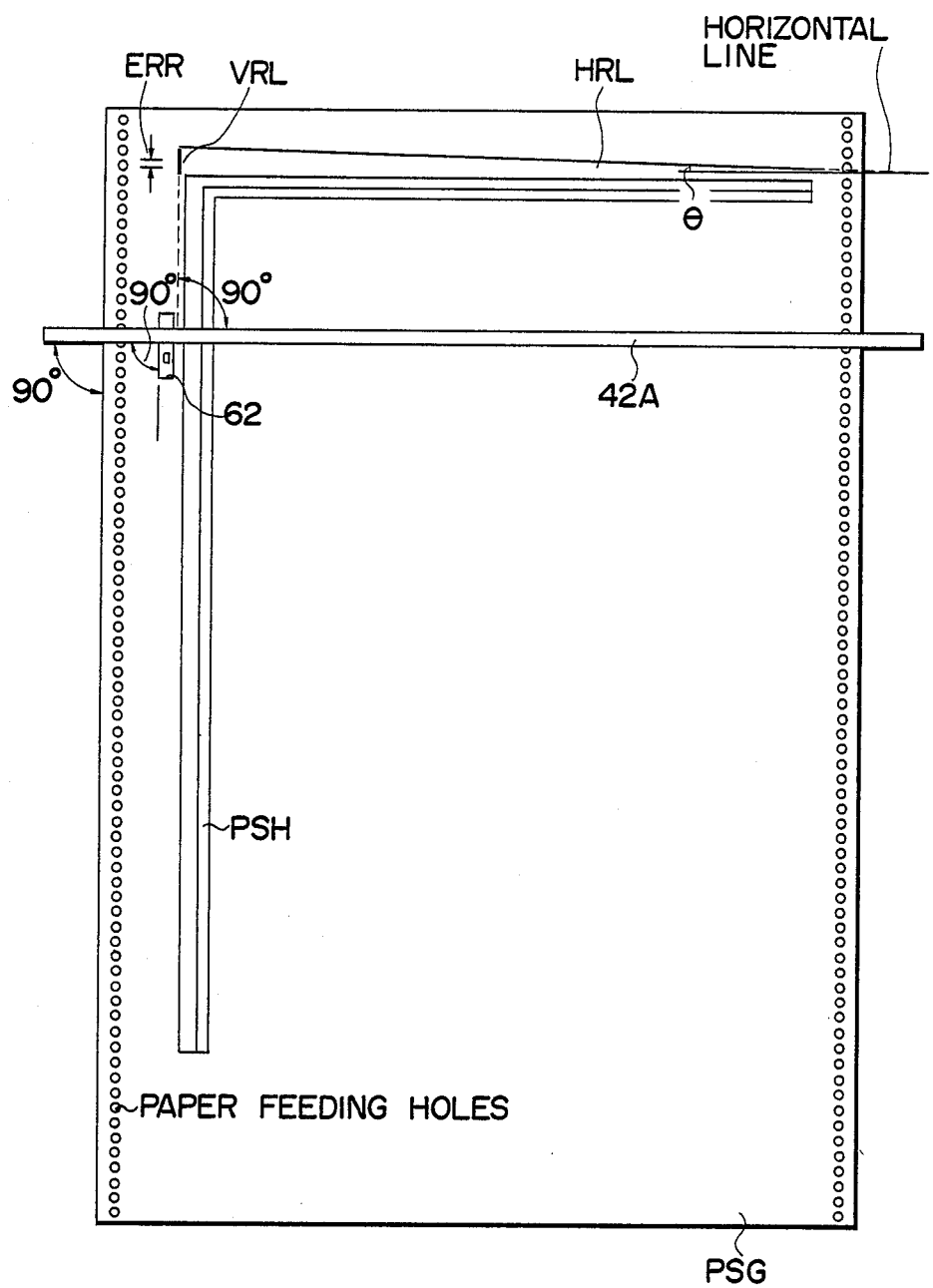
FIG. 8 shows the arrangement of a paper holding section.

As shown in FIG. 8, horizontal reference line HRL for forming horizontal correction data is recorded on paper guide sheet PSG at angle $\theta$ with respect to a moving direction of array 60 or horizontal line HL. Assuming that a length of paper fed when the carriage is moved by distance x during the reading operation is y, angle $\theta$ is given by $\theta = \tan^{-1} y/x$, i.e., data to be read is given along a horizontal line. By reading and determining line HRL, curved distortion of the readout data caused by distortion of the carriage guide shaft can be corrected.

As shown in an upper left portion of FIG. 8, vertical reference line VRL for forming vertical correction data is recorded on paper. Line VRL is parallel to a column direction of array 62 and is a thick and short line. By reading line VRL and detecting inclination of the readout data with respect to the column direction of array 62, mounting error of carriage 40 or inclination of the read data caused by the play of carriage 40 in a moving direction can be corrected. Note that line VRL is set longer than effective reading range ERR of array 62. In addition, the paper is held on paper guide sheet PSG by paper setting holder PSH.

As a result, the number of column data, the first bit of which is "1" is set in the B-register, the number of column data, the 69th bit of which is "1" is set in the C-register, and the total number of column data including "1" bit is set in the D-register. In this embodiment, column data of three columns are extracted, and data related to inclination of array 62 are stored in three registers V1, V2, and V3.

In order to explain the input scanning device of the present invention in detail, an interruption operation executed by CPU 100 in response to an interrupt signal from timers TM1 to TM3 will be described with reference to FIGS. 9 to 11.

Figure 9:
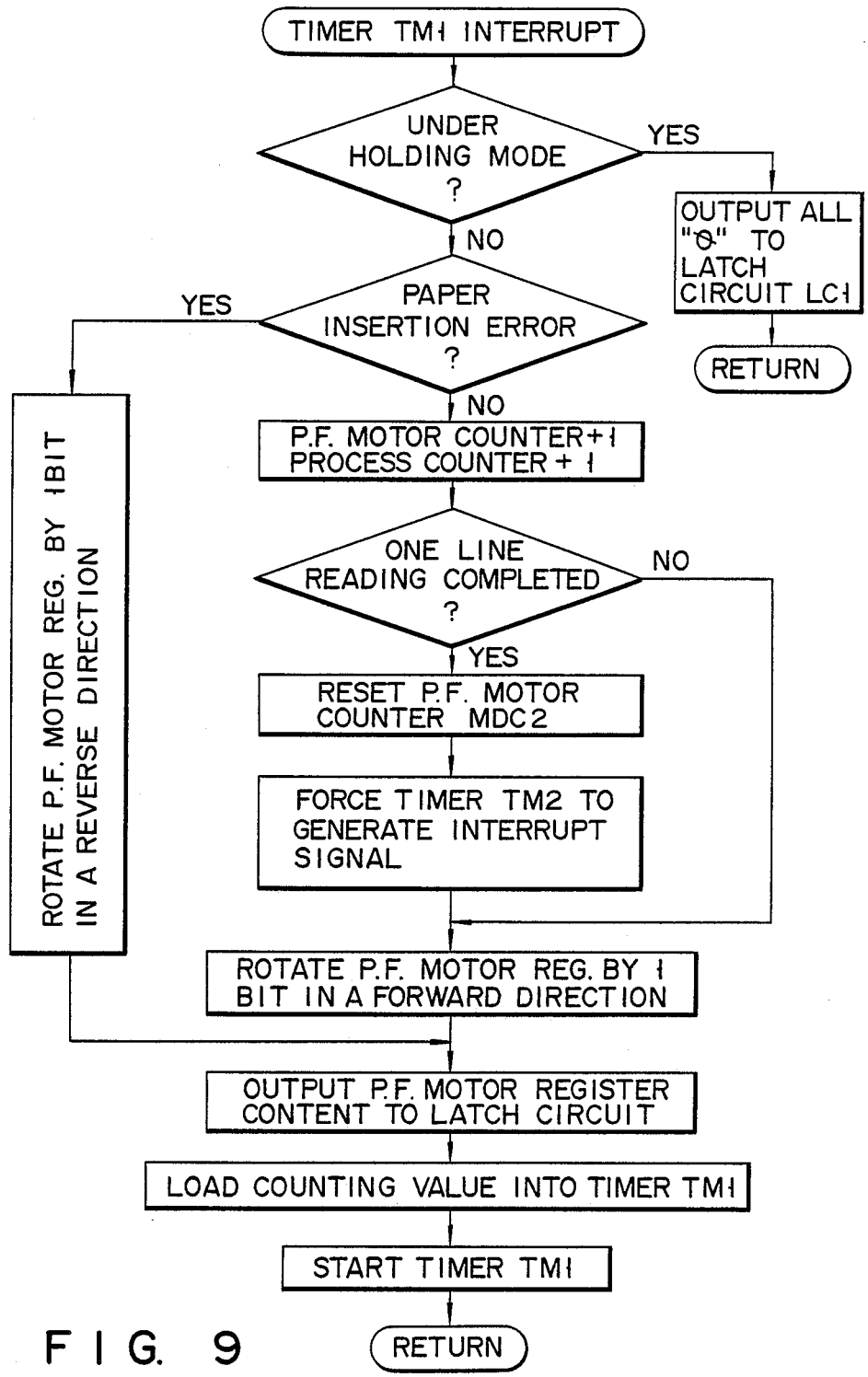
FIGS. 9 to 11 are flow charts showing the operation of first to third timers in the FIG. 2 circuit.

In FIG. 9, when an interrupt signal is supplied from timer TM1 in a hold mode in which motor 2 is kept stopped, "0" is set at every bit position of 8-bit driving register DR2. If the hold mode is not set and no error occurs in paper insertion, counts of counters MDC2 and CPC are incremented. In this case, if one scanning line is completed, counter MDC2 is reset, and the contents of register DR2 are shifted in a forward direction by one bit after the interrupt signal is generated from timer TM2. If reading of one scanning line is not completed yet, the contents of register DR2 are shifted in a forward direction by one bit. If an error occurs in paper insertion, the contents of register DR2 are shifted in a reverse direction by one bit.

After the contents of register DR2 are shifted in the forward or reverse direction, the contents of register DR2 are set in circuit LC1, and the count data from counter MDC2 is set in timer TM1.

Figure 10:
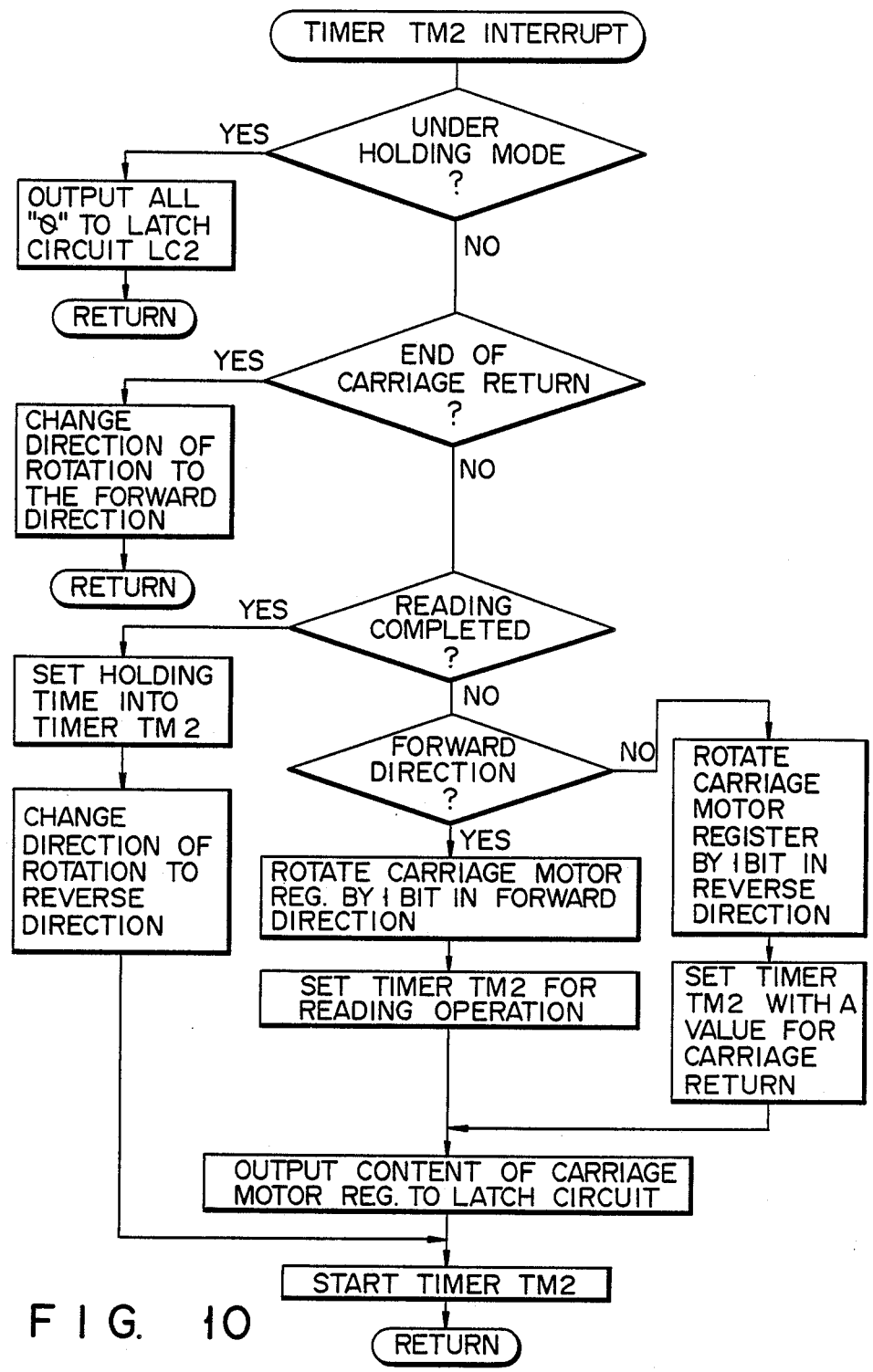

In FIG. 10, if timer TM2 is interrupted in the hold mode in which motor 34 is kept stopped, "0" is set in every bit position of 8-bit register DR3. If the hold mode is not set and return of carriage 40 is completed, flag FL6 is set to "1" to instruct forward rotation of motor 34. Thereafter, the flow waits until the interrupt signal is forcibly generated from timer TM2 in the routine shown in FIG. 9.

If carriage return is not completed and the data readout operation is completed, the hold time data is set in timer TM2, flag FL6 is set to "0", and then timer TM2 is activated. If the readout operation is not completed and it is detected that motor 34 is rotated in the forward direction, carriage return timer data is set in timer TM2 after the contents of driving register DR3 are shifted in a reverse direction by one bit, and timer TM2 is activated after the contents of register DR3 are set in circuit LC2. If motor 34 is rotated in the forward direction, data readout timer data is set in timer TM2 after the contents of register DR3 are shifted in the forward direction by one bit, and timer TM2 is activated after the content of register DR3 is set in circuit LC2.

Figure 11:
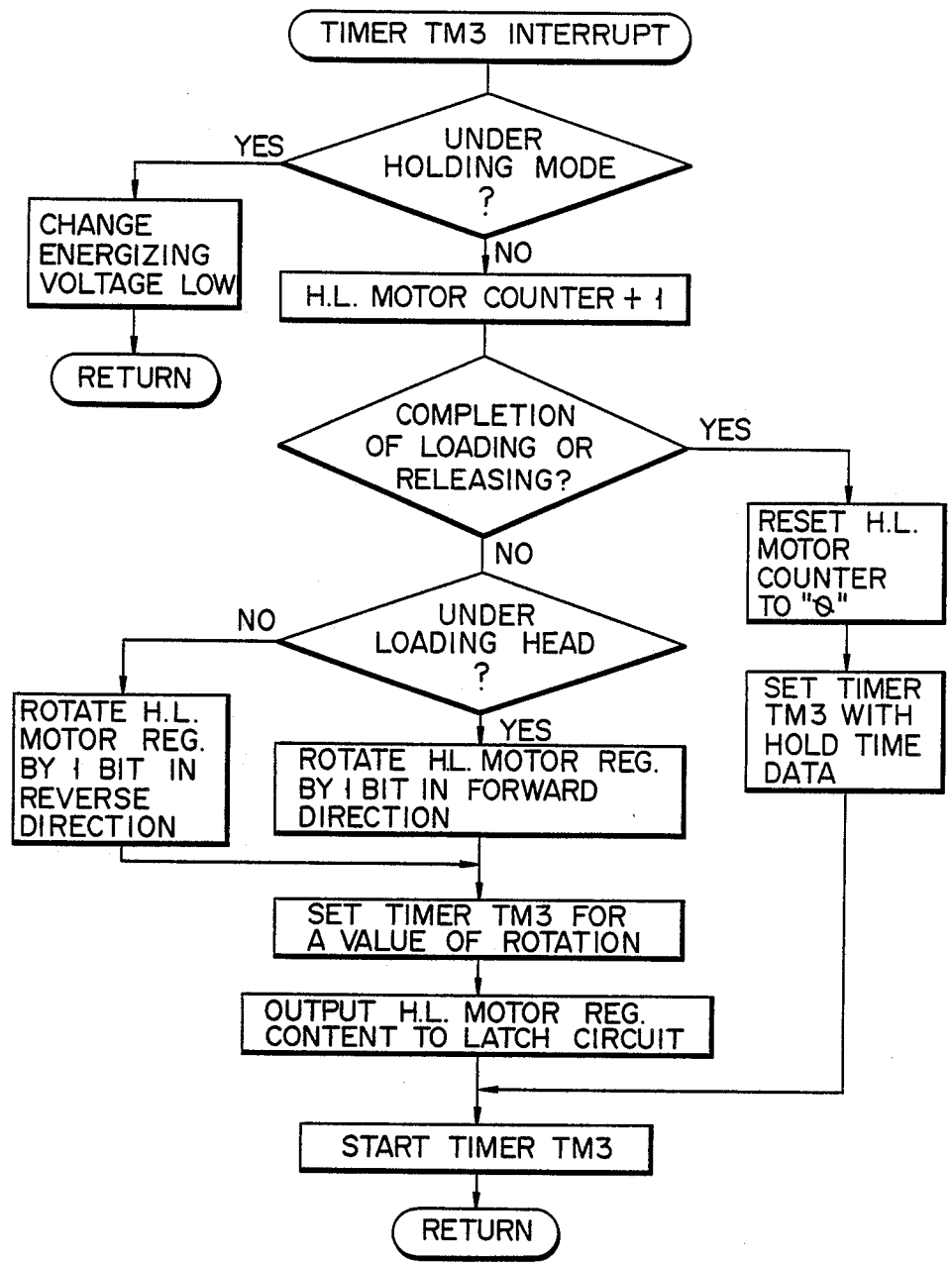

In FIG. 11, if timer TM3 generates an interrupt signal in the hold mode in which motor 50 is kept stopped, "0" is set in every bit position of 8-bit register DR1. If the hold mode is not set, count of counter MDC1 is incremented, and then CPU 100 checks whether a head load or head release operation is completed. If "YES", counter MDC1 is reset, the motor hold time data is set in timer TM3, and the timer TM3 is activated.

If the head load or head release operation is not completed, the contents of register DR1 are shifted in the forward or reverse direction by one bit, the motor rotation time data is set in timer TM3, the contents of register DR1 are set in circuit LC3, and then timer TM3 is activated.

An operation of the input scanning device shown in FIGS. 1 to 4 will be described in detail with reference to FIGS. 12 to 24.

Figure 13:
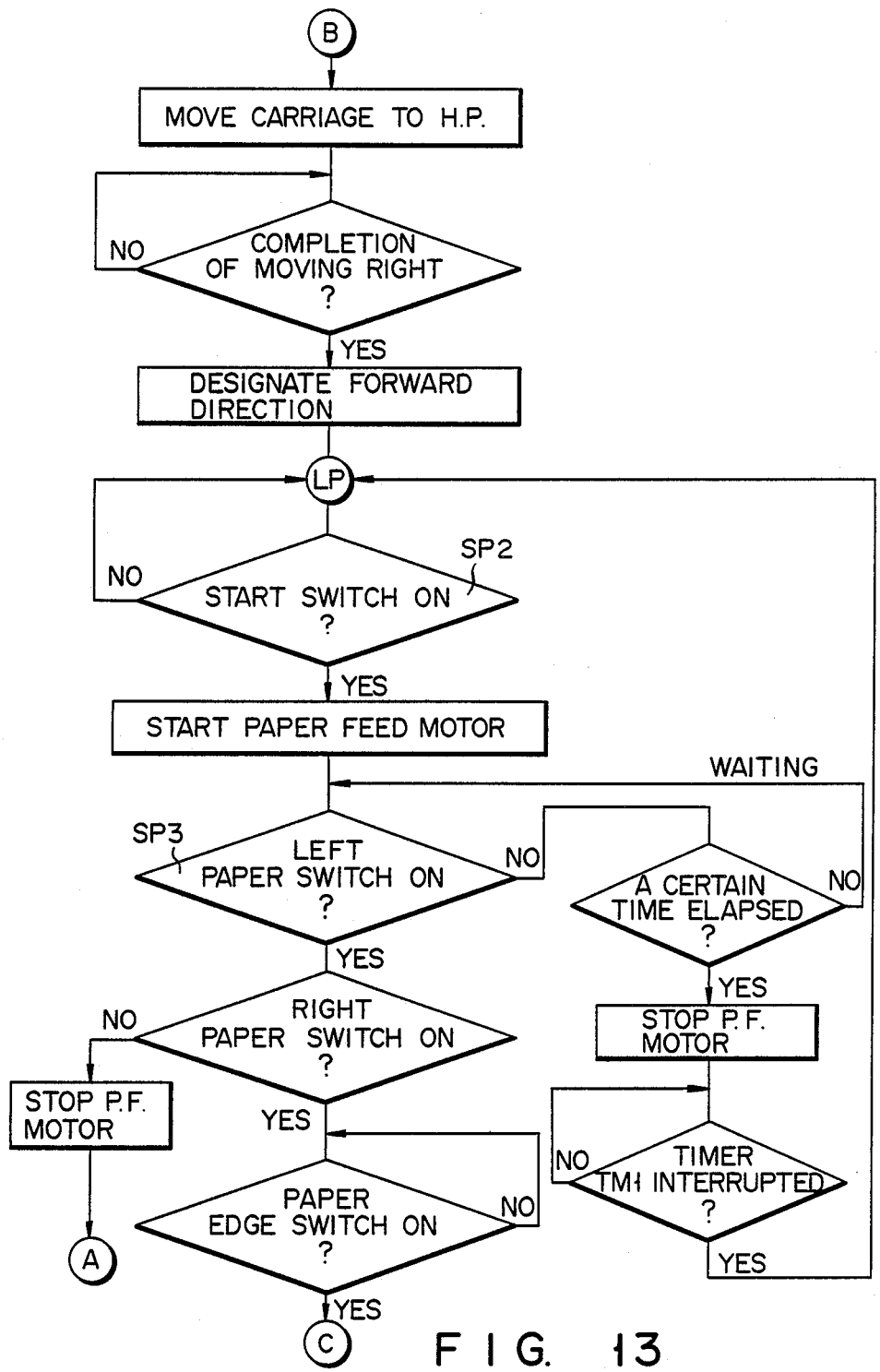

At first, when the power switch is turned on, CPU 100 performs initialization, as shown in FIG. 12, and then instructs to rotate motor 50 to set sensor section 44 in a release state. This is executed by repeatedly setting predetermined time data in timer TM3 predetermined times. When sensor section 44 is released as described above, CPU 100 checks whether paper is inserted in accordance with states of switches 30A and 30B. If "YES", motor 2 is driven to eject the paper in step SP1. When CPU 100 detects that the paper is not inserted, carriage 40 is moved to the left until switch 46 is turned on, and then stopped. Thereafter, as shown in FIG. 13, carriage 40 is moved to the right by a predetermined distance, i.e., set in the home position. Then, CPU 100 sets direction instruction flag FL6 to "0" to allow right movement of carriage 40 and set a standby state. In this state, if CPU 100 detects that switch SWS is operated, CPU 100 instructs to rotate motor 2 using timer TM1. When paper is inserted and fed by rollers 6A and 6B and CPU 100 detects in step SP3 that switch 30A is turned on, CPU 100 checks whether switch 30B is turned on. If CPU 100 detects that switch 30B is not turned on, CPU 100 instructs to stop motor 2, and executes step SP1 to eject the paper. When CPU 100 detects in step SP3 that switch 30A is turned off when a predetermined time has passed, CPU 100 instructs to stop motor 2 and executes step SP2 again in response to the interrupt signal from timer TM1. When CPU 100 detects in step SP3 that switch 30A is turned on and then switch 30B is turned on, the paper is fed until switch 32 is turned on.

Figure 14:
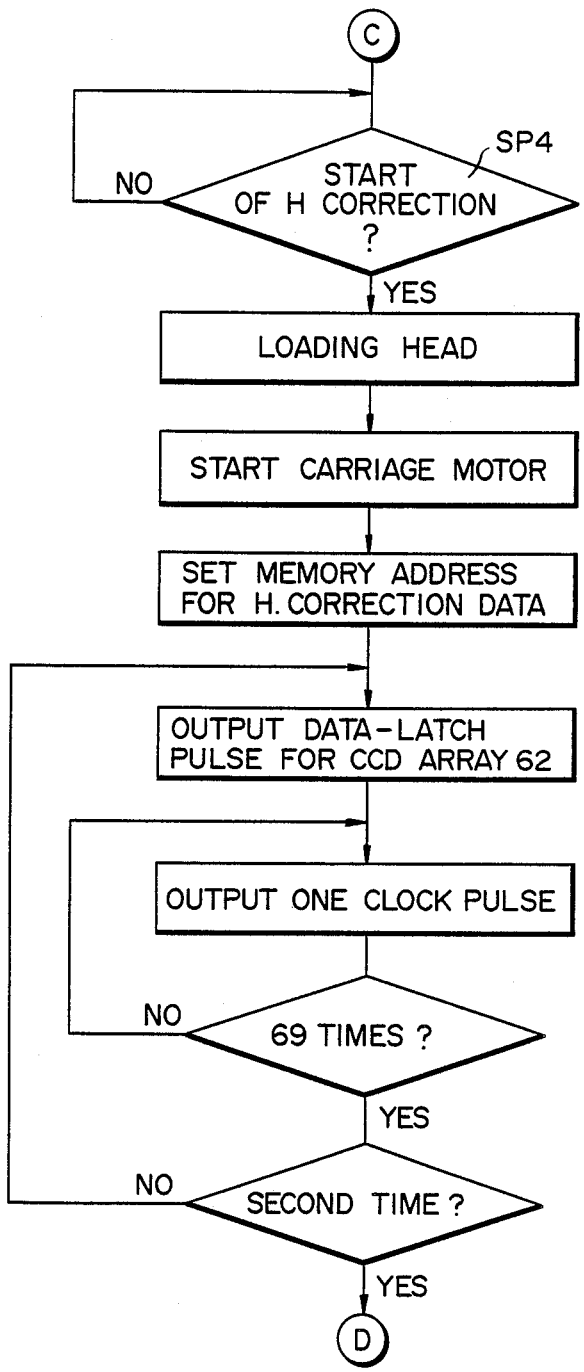
Figure 16:
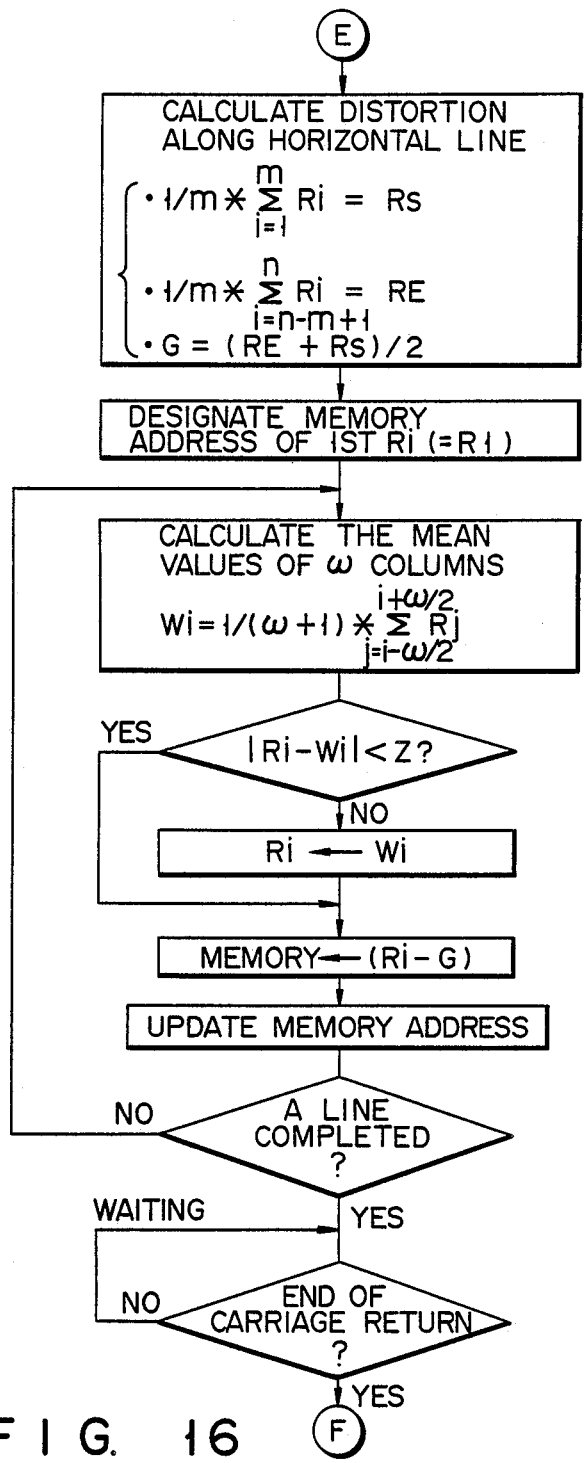

When switch 32 is turned on and CPU 100 detects in step SP4 in FIG. 14 that the paper is fed by a predetermined distance, i.e., sensor section 44 reaches the leading edge of line HRL, CPU 100 instructs to load sensor section 44. This position setting is executed by, e.g., checking whether the contents of counter CPC in memory 102, for counting the times at which the time data are set in timer TM1 after switch 32 is turned on, reach a predetermined value.

Thereafter, CPU 100 instructs to rotate motor 34 while causing paper feed, and move carriage 40 along line HRL. In this case, a moving distance in the horizontal direction of carriage 40 is set in accordance with a paper width detected by switch SW2.

At first, first address AD1 of horizontal correction memory HCM is set, and shift registers of circuit NFC are reset. Then, a latch signal is supplied to converter PSC so that converter PSC latches 69-bit data supplied from array 62 and representing density information in a first column area on the paper scanned by array 60. Thereafter, a clock signal is supplied to converter PSC and shift registers SR1 to SR4, and 69-bit data in converter PSC are sequentially stored in first 69-bit shift register SR1. The same operation is executed, and the 69-bit data corresponding to a second column area on the paper scanned by array 60 is stored in first 69-bit shift register SR1.

As shown in step SP5 in FIG. 15, 69 clock pulses are generated after the latch signal is generated, and data respectively corresponding to the third, second, and first column areas are stored in the first shift register, second shift registers (2-bit and 67-bit) SR2 and SR3, and final shift register of SR4 circuit NFC. Thereafter, CPU 100 supplies a write-in signal to circuit LC5 and the 69-bit data from the shift register SR4 of circuit NFC to circuit LC5. In addition, CPU 100 generates a readout signal to read out the 69-bit data, and write it in the 69-bit ACC-register. Then, "0" is set in the carry bit position of the ACC-register and the B- and C-registers, the contents of the ACC-register are shifted toward upper bits until "1" appears in most significant bit position CY, i.e., until one side of line HRL is detected, and this shift amount is stored in the B-register. In addition, the contents of the ACC-register are shifted toward the upper bits until "0" appears in position CY, i.e., until the other side of line HRL is detected, and this shift amount is stored in the C-register. Data Ri which represents a central position of line HRL is calculated by contents B of the B-register and contents C of the C-register in accordance with the following equation:

$$Ri = B + C/2$$

Data Ri thus obtained is stored at an address position in memory HCM designated by address ADi, and the designated address of memory HCM is incremented by "1". When this operation is repeatedly executed and data Rn is written in a memory location of memory HCM at address ADn (n is a maximum number of columns in a widthwise direction), CPU 100 instructs to release sensor section 44 and move carriage 40 to the left. During this return of carriage 40, central position data RS and RE at the leading edge and the trailing edge of line HRL obtained by calculations of the following equations are respectively stored in leading edge and trailing edge registers RS and RE:

$$RS = 1/m \times \sum_{i=1}^{m} Ri \ (m \text{ is a predetermined number})$$

$$RE = 1/m \times \sum_{i=n-m+1}^{n} Ri$$

$$G = (RS + RE)/2$$

Then, after an address of memory HCM is set in AD1, the following equation is calculated in step SP6:

$$Wi = 1/(\omega + 1) \times \sum_{j=i-\omega/2}^{i+\omega/2} Rj \ (\omega \text{ is an even number})$$

When an absolute value of a difference between data Wi and Ri is smaller than predetermined value Z, data Wi instead of data Ri is stored at address position ADi of memory HCM. Thereafter, data (Ri - G) which is rounded to make an integer is stored in memory area ADi of correction memory HCM, and an address count of memory HCM is incremented. When CPU 100 detects that data (Rn - G) is stored at position and, i.e., after CPU 100 detects that correction data (R1 - G) to (Rn - G) corresponding to data R1 to Rn obtained throughout the length of line HRL are stored in memory HCM, CPU 100 checks whether carriage 40 returns to the left end position. This detection of carriage return is executed in synchronism with a sync signal generated in the interrupt routine of timer TM1.

Figure 17:
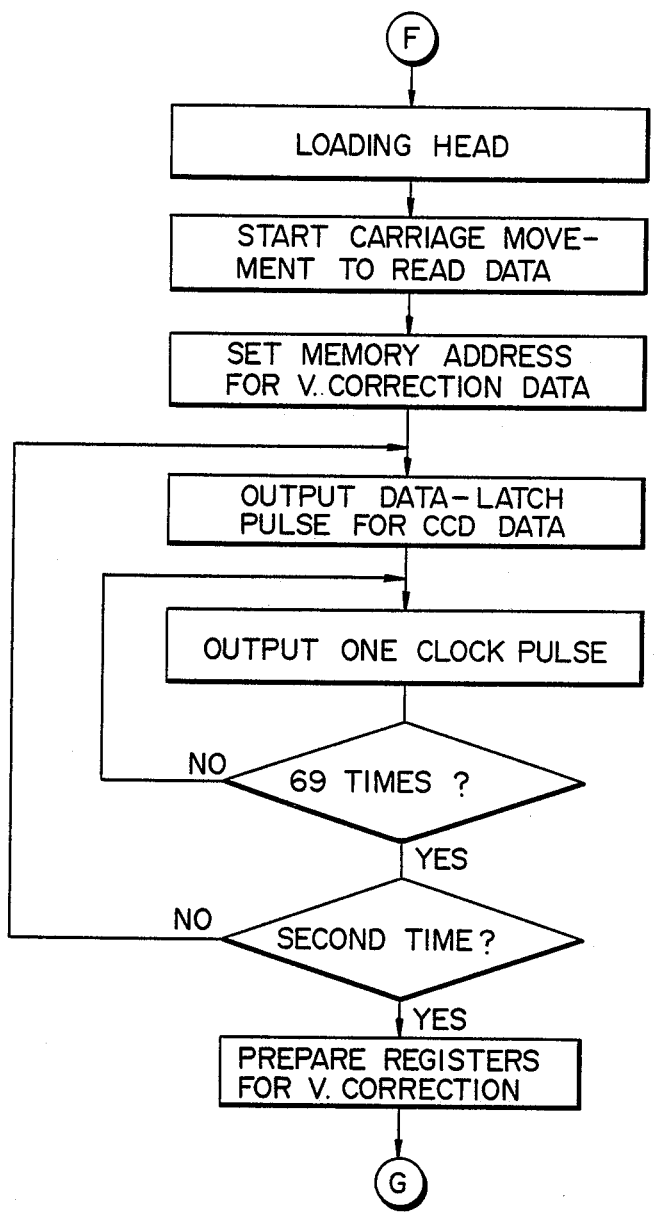
Figure 18:
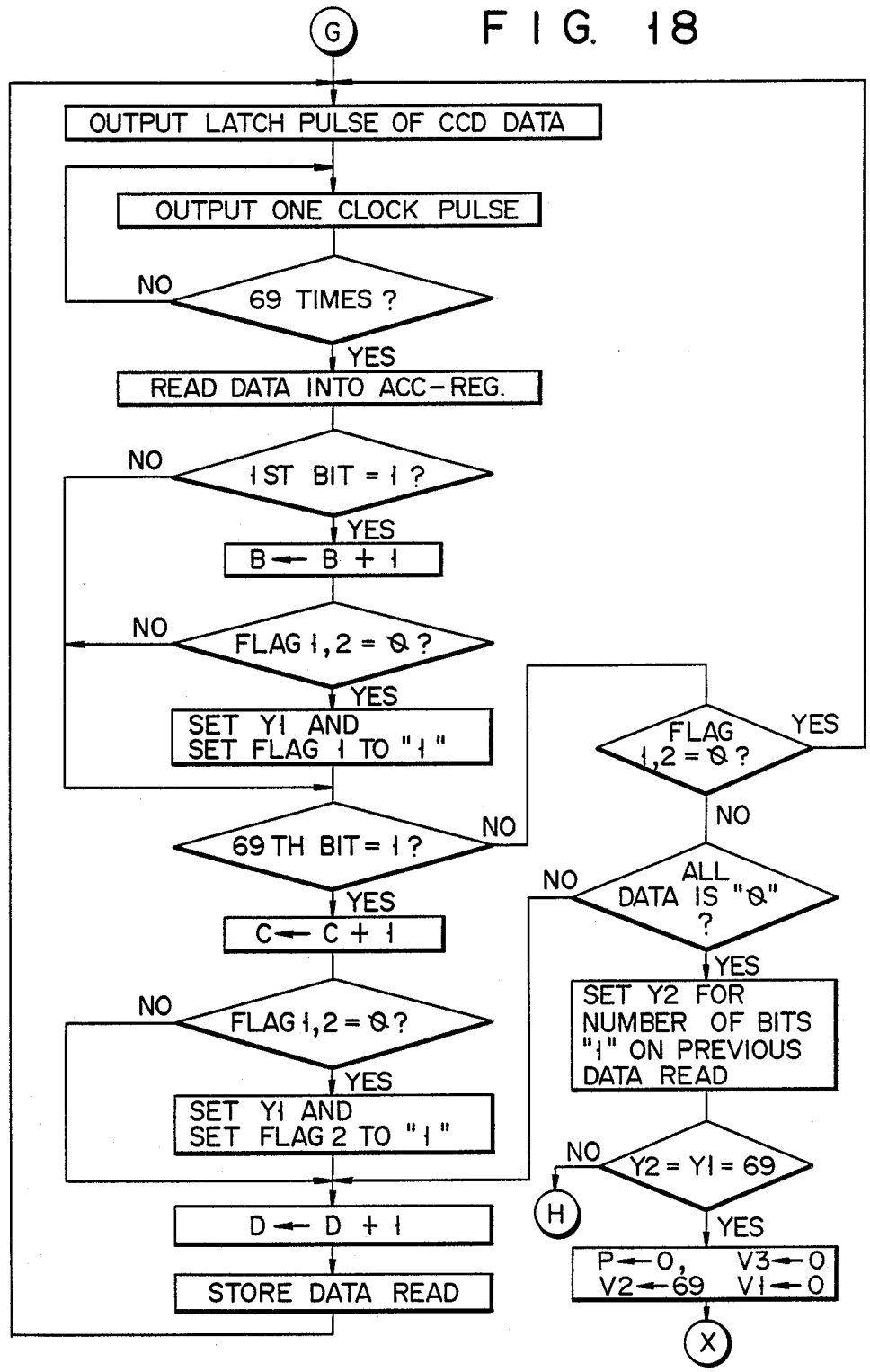
Figure 19:
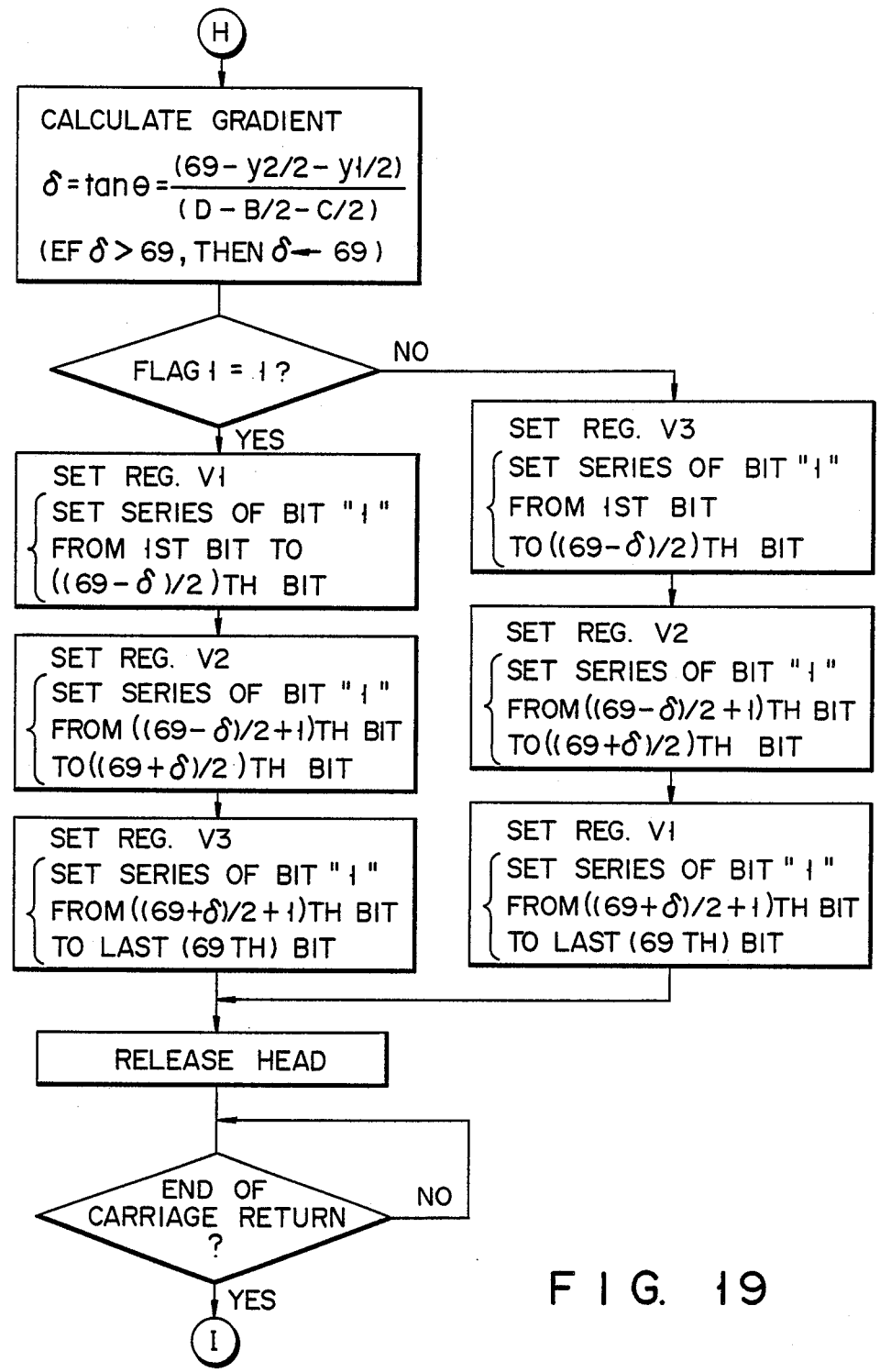
Figure 20:
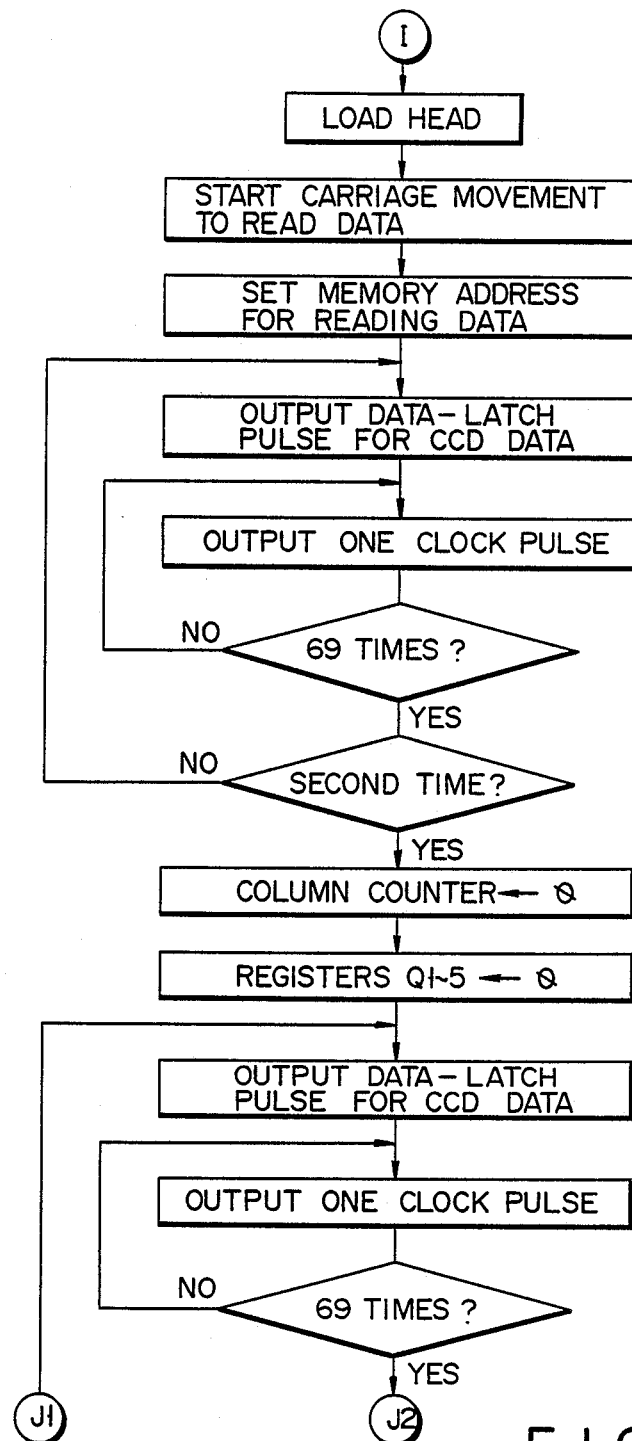
Figure 21:
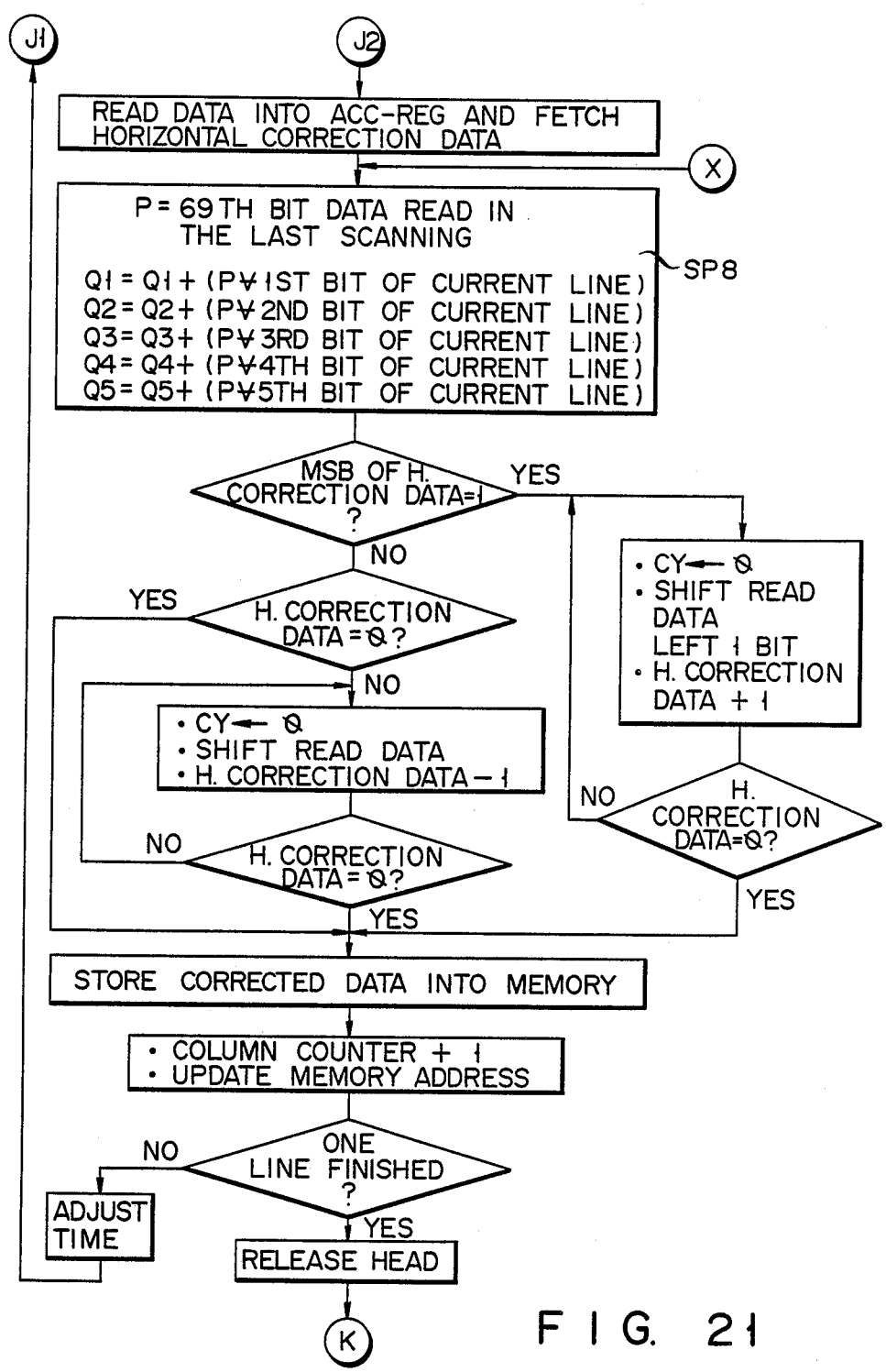
Figure 22:
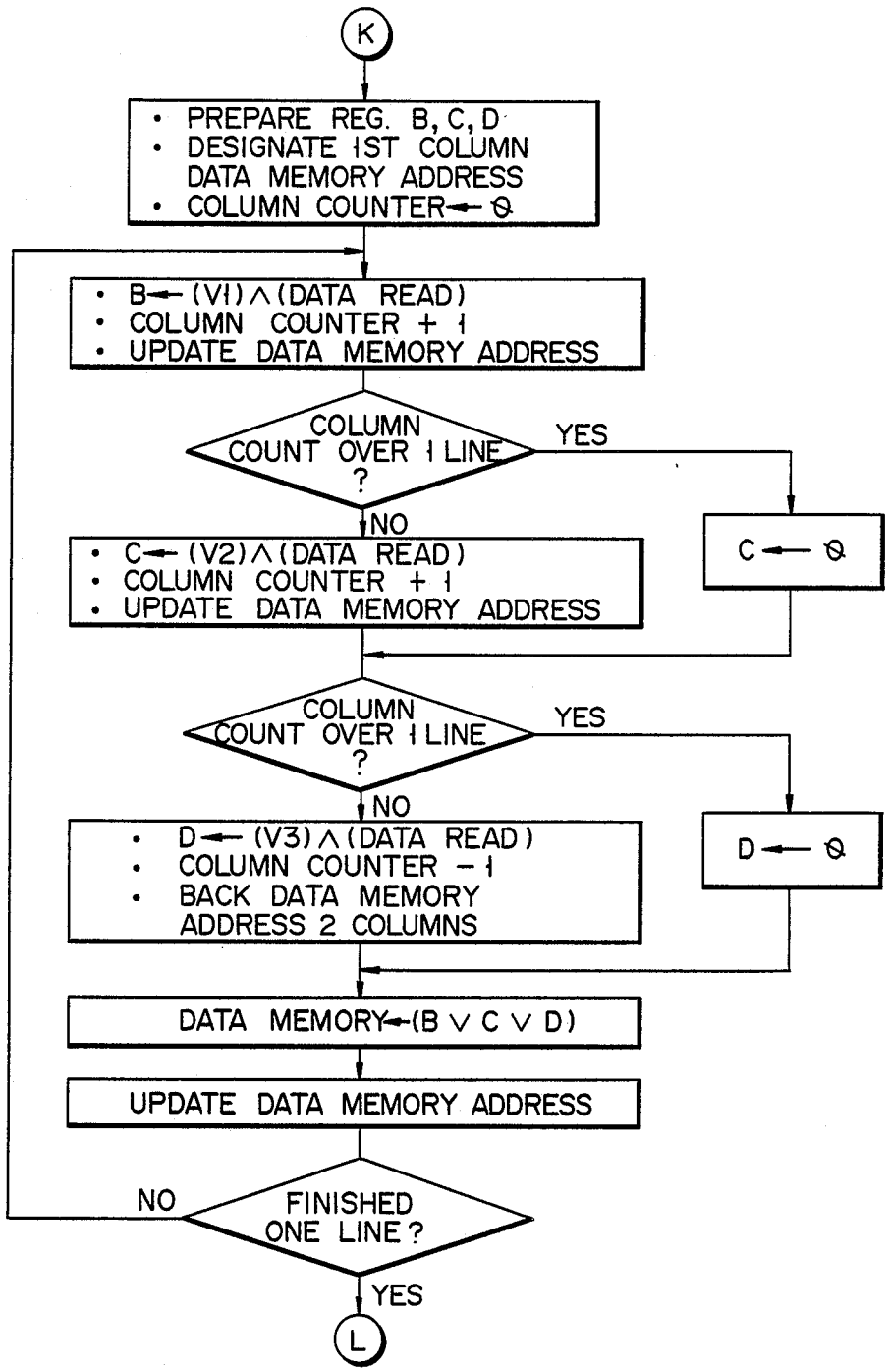
Figure 24:
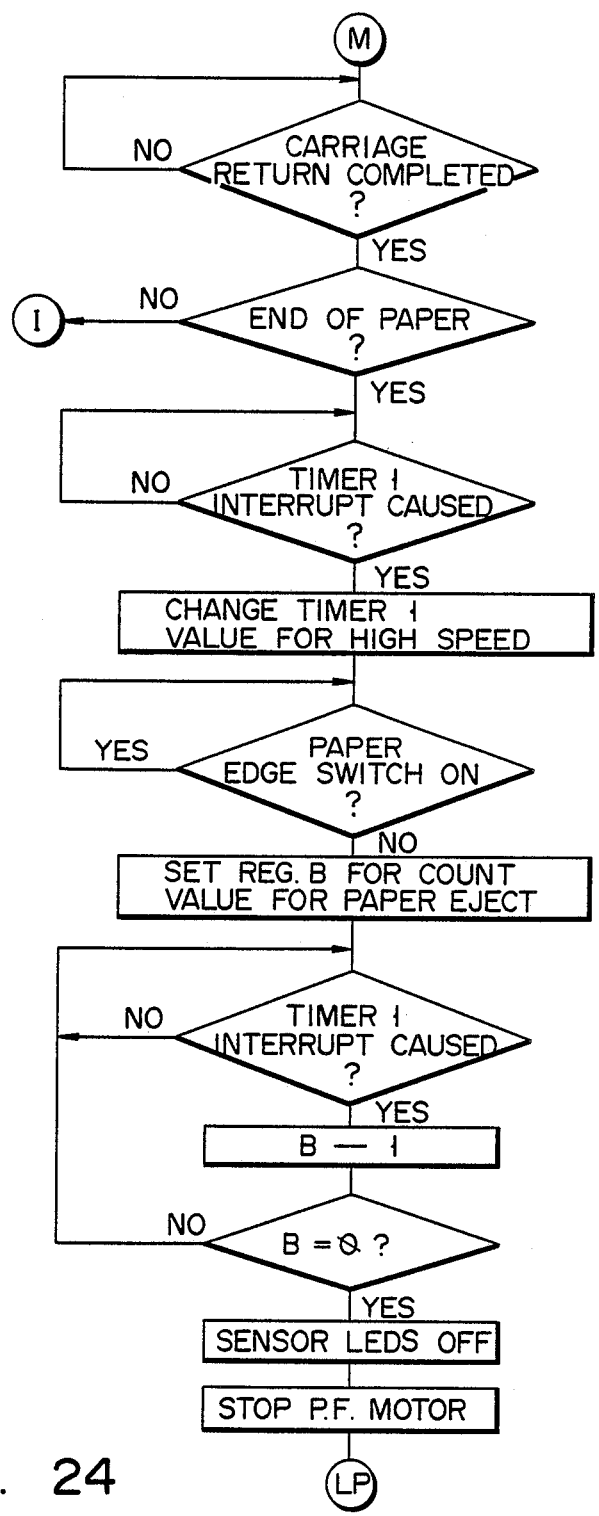

The horizontal correction data formation routine is thus ended, and the vertical correction data formation routine shown in FIGS. 17 to 19 starts to be described below.

At first, CPU 100 instructs to load sensor section 44, and then move carriage 40 to the right and set first address BD1 of memory DM2. At this time, the A-, B-, and C-registers, and registers SR1 to SR4 of circuit NFC are reset. Then, in a manner similar to horizontal position correction, the 69-bit data from array 62 are sequentially latched by converter PSC and sequentially stored in shift registers SR1 to SR4 of circuit NFC. The 69-bit data from circuit LC is stored in the ACC-register every time the 69-bit data is read out from array 62. If the first bit of the 69-bit data stored in the ACC-register is "1", the contents of the B-register are incremented by "1". Thereafter, if both flags FL1 and FL2 are "0", the number of successive "1" bits including the first bit is stored as data Y1 in register YB, and then flag FL1 is set to "1". Then, CPU 100 checks whether the 69th bit is "1". If CPU 100 detects that the 69th bit is "1", the contents of the C-register are incremented by "1". Thereafter, if both flags FL1 and FL2 are "0", the number of successive bits is stored as data Y1 in register YB, and then the contents of the D-register are incremented by "1". Then, the next data is fetched from array 62 and processed as described above.

If CPU 100 detects that the 69th bit is "0", it checks whether both flags FL1 and FL2 are "0". If both the flags are "0", the next data is read out from array 62, and if at least one of the flags is "1", CPU 100 checks whether all the data in the ACC-register are "0". If CPU 100 detects that at least one "1" bit is stored, the content of register BY is incremented by "1". If CPU 100 detects that all the bits are "0", the number of successive bits "1" read out in the immediately preceding cycle is stored as data Y2 in register YC.

Then, utilizing data B, C, D, Y1, and Y2 thus obtained, gradient P of array 62 which is represented by tangent (tan $\theta$) of angle $\theta$ with respect to reference line VRL is obtained by the following equation:

$$P = \tan\theta = (69 - Y1/2 - Y2/2)/(D - B/2 - C/2)$$

Thereafter, if CPU 100 detects in step SP7 that flag FL1 is "1", i.e., it determines that array 62 is inclined to the left, "1"s are respectively set at the first to the $\{(69-P)/2\}$th bit positions of register V1, "1"s are respectively set at the $\{(69-P)/2+1\}$th to the $\{(69+P)/2\}$th bit positions of register V2, and "1"s are respectively set at the $\{(69+P)/2+1\}$th to the 69th bit positions of register V3. Thereafter, sensor section 44 is released, and carriage 40 is returned to the left end position. If CPU 100 detects in step SP7 that flag FL1 is "0", "1"s are respectively set at the first to the $\{(69-P)/2\}$th bit positions of register V3, at the $\{(69-P)/2+1\}$ to the $\{(69+P)/2\}$ bit positions of register V2, and at the $\{(69+P)/2+1\}$ to the 69th bit positions of register V1.

When the horizontal and vertical correction data is thus formed, the data reading operation is then started.

At first, sensor section 44 is loaded as in the horizontal and vertical correction operations to move carriage 40 to the right, and the first address of data memory DM1 and first address AD1 of horizontal position correction memory HCM are set in the address register. After the two successive 69-bit data are read out from array 62, column address counter CAC is reset to "0", and registers 81 to 85 are reset to "0". Thereafter, the 69-bit data is stored in the ACC-register every time it is read out from array 62, and the horizontal correction data is read out from a memory area at address position AD1 of memory HCM. Then, an exclusiveOR signal of each of five upper bits UB1 to UB5 of the 69-bit data stored in the ACC-register and the 64th bit of the 69-bit data in memory DM2 read out on the first column of the preceding scanning row is obtained, and each result obtained by adding a value of the exclusiveOR signal to the contents of a corresponding one of registers Q1 to Q5 is stored in the corresponding one of registers Q1 to Q5. Therefore, when correction processing with respect to one readout scanning row is completed, five overlapping degree data are obtained for five bit rows such that the values of the exclusiveOR signals of the 64th bit of each column on the upper scanning line and five upper bits of the corresponding column on the current scanning line are added in each bit row, and are stored in registers Q1 to Q5. The smaller the overlapping degree data is, the higher the degree of overlapping is. Each of currently readout column data is shifted in an upper or lower bit direction on the basis of a bit position where the degree of overlapping is maximum. Note that the 65th to 69th bits of each column data of the upper scanning line are used as dummy bits. Thereafter, if CPU 100 detects that most significant bit MSB of the horizontal correction data read out from memory HCM is "1" which represents a positive shift amount, the readout data is shifted in the upper bit direction by the shift amount represented by the horizontal correction data. If bit MSB of the horizontal correction data is "0", the 69-bit data is shifted in the lower bit direction by the shift amount represented by the horizontal correction data. The data thus corrected is stored at the first column address position of corrected data memory CDM. Then, after the contents of counter CAC are incremented, CPU 100 checks whether the count of counter CAC becomes n, i.e., correction of one scanning line is completed. If correction of one scanning line is not completed, the correction processing is performed to the 64-bit data on the designated column in the same manner as described above, and this result is stored at the designated column address position of memory CDM.

When the correction processing with respect to one scanning line is completed, sensor section 44 is released to move carriage 40 to the left. Before carriage 40 is returned to the left end position, the vertical correction and the line adjustment to be described below are executed.

At first, the first address of data memory CDM is designated, and counter CAC is reset to "0". Then, a logical product between the 64-bit data in register V1 and upper 64 bits of the 69-bit data read out from memory DM is obtained and stored in the B-register, and the count of counter CAC and the address of memory CDM are incremented. A logical product between upper 64 bits of the 69-bit data read out from memory CDM and the 64-bit data in register V2 is stored in the C-register. Thereafter, the count of counter CAC and the address of memory DM are incremented, and a logical product between upper 64 bits of the 69-bit data read out from memory DM and the 64-bit data in register V3 is stored in the D-register. Then, the count of counter CAC is decremented, and the address of memory DM is decremented by "2". Note that during the above operation, if the count of counter CAC exceeds n, "0" is set in either the C-register or the C- and D-registers.

Then, a logical sum of the B-, C-, and D-registers is obtained and stored at the designated address position in memory DM. Thereafter, the same operation is repeatedly executed until the nth column data is obtained. When data processing of one scanning line is thus completed, line adjustment is then executed. In the case of data processing for the first scanning line, "3" is stored in register VCR. In the case of data processing for the second and following scanning lines, CPU 100 checks whether contents of registers Q3, Q2, Q4, Q1, and Q5 are smaller than empirically determined value α in this order. A corresponding value among "3", "4", "2", "5", and "1" is stored in register VCR in a step where "YES" is obtained. If all the contents of registers Q1 to Q5 are larger than α, "3" is stored in register VCR. Thus, the overlapped bit number of scanning lines of two successive rows is confirmed.

Figure 25:
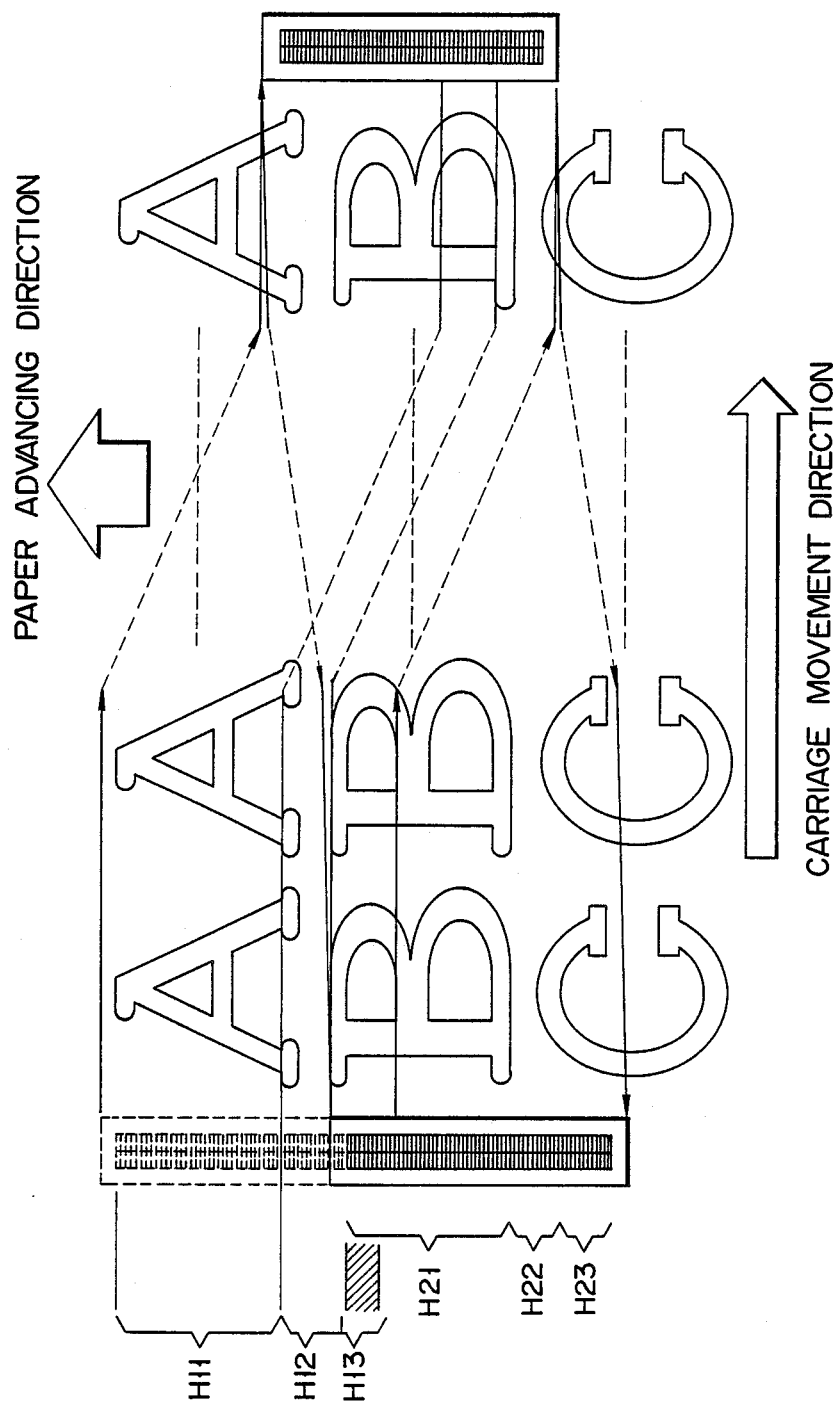
FIG. 25 shows a relation between the horizontal and vertical movements of a carriage.

In FIG. 25, assuming that the moving paper is in a stationary state, CCD array 62 is relatively moved from positions H11, H12, and H13 to positions H21, H22, and H23 when one-row reading is completed (carriage return is completed). As is apparent from FIG. 25, the length of CCD array 62 is set longer than a distance by which the paper actually moves when one scanning line is read.

A hatched portion in FIG. 25 is read twice when two successive scanning lines are read. According to the interrow or interline correction of this embodiment, the data thus read twice of each column is compared with each other, thereby determining the overlapped bit number on the basis of the degree of coincidence. In this case, H11 corresponds to a distance by which the paper moves during the reading operation (left to right), H12 corresponds to a distance by which the paper moves during carriage return, i.e., during an operation except for the reading operation, and H13 is an overlapped reading portion.

When the overlapped bit number between two successive scanning lines is detected in the abovementioned manner, readout data for each column is read out from memory CDM to the ACC-register, and each column data is shifted by an amount corresponding to the contents of register CDM and then output. For example, when CDM=3, column data of the lower scanning line is shifted toward the upper bit direction by 3 bits, and 64-bit data of 4th to 67th bits of the column data are output as effective data. This operation is executed with respect to all the n columns of one character line.

After this operation is completed, completion of return of carriage 40 and the trailing edge of the paper are detected, CPU 100 waits for an interrupt signal from timer TM1. In response to the interrupt signal from timer TM1, CPU 100 sets short-time data in timer TM1 and instructs to feed the paper at a high speed until switch 32 is turned on. Thereafter, CPU 100 instructs to feed the paper by an amount required for discharging the paper and then to stop motor 2.

According to the above embodiment, the following effects can be obtained.

(1) Mass production can be performed by mass production techniques developed for serial dot printers.

(2) Since a mechanism itself of a device does not require high accuracy, the device can be easily manufactured.

(3) Manufacture of a sensor section such as a CCD does not require a very high yield.

(4) Since high-precision inputs can be performed, the device can be used for graphic inputs and the like.

(5) Since distortion generated during transport can be easily compensated, transport expenses can be reduced.

(6) Since the device can be easily handled, no special technique is required to use it.

(7) The device can be made compact and light in weight because of its simple structure.

(8) Since parts to be used are inexpensive, the device can be manufactured at low cost.

The present invention has been described above with reference to the embodiment, but the present invention is not limited to the above embodiment. For example, FIG. 8, horizontal and vertical reference lines HRL and VRL are drawn on a heat-proof and flexible sheet such as a polyester film for guiding paper, but they may be directly drawn on the paper to be read.

As shown in FIG. 26, the paper held by the paper holding member can be fed such that the scanning line on the paper is arranged parallel to horizontal reference line HRL while the carriage guide shaft is arranged perpendicularly to a paper feeding direction. In this case, in order to read data on the paper along the scanning line by sensor head section 44, CCD array 62 is arranged parallel to a longitudinal direction of the paper.

Similarly, as shown in FIG. 27, the carriage guide shaft is arranged parallel to horizontal reference line HRL, and the paper can be held by the paper holding member such that the scanning line on the paper is arranged perpendicularly to the paper feeding direction.

In the above embodiment, vertical correction is performed during carriage return. However, vertical correction for each column data can be performed when each column data is read. As a result, the reading operation can be performed in both directions. In this case, sync lines are provided at left and right ends of the guide sheets, and readout data of the sync lines can be used as sync signals to match left and right readout data with each other.

In addition, by increasing a reduction ratio of the gear of the carriage feeding motor and by performing phase shifts of the pulse motor by plurality of times during movement of one column in the reading operation, the shift number of the pulse motor is increased during white reading (readout data="0") to rotate the pulse motor at a high speed, thereby increasing a moving speed of the carriage. In this case, however, an output signal from the sensor block which becomes "active" when latched data of the sensor data latch circuit are all "0"s must be provided.

Assume that the gradient of input data line with respect to a horizontal direction is $\theta$, a currently reading column is the mth column, and a pitch between columns is $\Delta x$. In this case, a distance between the first column and the current column is obtained by $l=\Delta x \cdot m$. Assuming that a pitch between CCD sensors of array 62 is d, the moving dot number by the gradient of CCD array 62 with respect to a vertical (paper feeding) direction is obtained by $(l \times \tan \theta)/d$. Therefore, this moving dot number may be calculated every time data is actually read, and the corresponding bit data may be shifted downward. This downward shift may be performed immediately after data is stored in the Acc-register and before progressive processing of Q of interline correction processing in step SP8 in FIG. 20.

What is claimed is:
1. An input scanning device comprising:
paper holding means for holding paper to be scanned;
paper feeding means for continuously feeding the paper in a first direction at substantially a constant speed;
scanning means for scanning the paper in a second direction substantially perpendicular to the first direction, scanned areas scanned in two successive scanning cycles by said scanning means being partly overlapped on each other;

memory means for storing data supplied from said scanning means; and control means for deriving column data each formed of a plurality of bits from said scanning means at a regular interval for each column and sequentially storing the derived column data into said memory means, detecting the overlapped bit number between two successive scanned data by comparing each column data of one of the two successive scanned data and corresponding column data of the other scanned data, and cancelling the detected number of overlapped bits from each column data of one of the two successive scanned areas.

2. An input scanning device according to claim 1, which further comprises means having a straight line drawn in substantially the second direction in a position prior to the data readout starting position, and in which said control means detects the difference between the line data directly corresponding to said line and actually readout line data for each column, stores the difference for each column in said memory means, and corrects the readout scanned data based on the difference data for each column.

3. An input scanning device according to claim 2, which further comprises means having a straight line drawn in substantially the first direction in a position prior to the readout starting position, and in which said scanning means has an array of sensors and said control means detects the displacement of each of said sensors based on the readout line data, and corrects the readout scanned data according to the displacement data for each column.

4. An input scanning device according to claim 1, which further comprises means having a straight line drawn in substantially the first direction in a position prior to the readout starting position, and in which said scanning means has an array of sensors and said control means detects the displacement of each of said sensors based on the readout line data, and corrects the readout scanned data according to the displacement data for each column.

5. A serial reading type input scanner comprising:
a paper feed mechanism for successively feeding paper to be read at a constant speed during an entire operation;
a carriage moving in a direction perpendicular to a feeding direction of the paper during reading and return;
light source means mounted on said carriage and emitting light onto the paper, and an array of a plurality of optical reading sensors arranged on said carriage in the same direction as the moving direction of the paper, for receiving light emitted from said light source means and reflected from the paper to be read, and for varying an output voltage in accordance with an intensity of the reflected light, a reading width of said optical reading sensors being set larger than a length of the paper successively fed during the entire operation including a reading operation for one row, a direction switching operation, a return operation, and a direction switching operation; and
a sequential memory for storing information simultaneously read out in a predetermined cycle by said array of a plurality of optical sensors during onedirection movement of said carriage,
wherein said carriage is returned to a position before reading, a reading operation of the next row is started, data of bit row among the data stored by the preceding reading operation and the data to be input by the current reading operation and assumed to theoretically overlap the preceding readout data is compared with data of bit adjacent thereto for each and the same reading column, an absolute value of a comparison result is added for each bit row throughout the row, if a degree of coincidence exceeds a predetermined value, it is determined that the one bit input information row overlaps the preceding readout row, a bit row having a largest possibility of overlapping is determined in accordance with the degree of coincidence of each bit row, and the entire readout data is shifted by the number of bit rows determined to overlap in the preceding readout data direction for each of the preceding readout rows, thereby eliminating a blank and an overlapped portion between readout rows.

6. An input scanner according to claim 5, wherein a straight line drawn in a moving direction of said carriage is read before data to be read is read, a degree of distortion of the straight line is compared, in units of columns, with original information written before the straight line is read, all the comparison results are stored, and the readout data to be actually read is corrected on the basis of the comparison results in said memory, thereby correcting the distortion of the input information caused by deformation of the device and the like.

7. An input scanner according to claim 5, wherein a straight line drawn in an arranging direction of said reading sensors is read before data to be read is read, a degree of a gradient of the straight line with respect to original information written before the straight line is read is calculated in accordance with the readout data of a plurality of columns, the gradient information is stored in said memory, and each column to be read is corrected on the basis of the gradient, thereby correcting a gradient of the input information caused by a gradient of the sensor array with respect to its designed position.

8. An input scanner according to claim 6, wherein a straight line drawn in an arranging direction of said reading sensors is read before data to be read is read, a degree of a gradient of the straight line with respect to original information written before the straight line is read is calculated in accordance with the readout data of a plurality of columns, the gradient information is stored in said memory, and each column to be read is corrected on the basis of the gradient, thereby correcting a gradient of the input information caused by a gradient of the sensor array with respect to its designed position.

9. An input scanner according to claim 9, wherein paper to be read is fixed on a guide sheet having paper guide holes provided at equal intervals at both sides and on which a straight line for correcting distortion of readout data during carriage movement and a straight line for correcting the gradient of readout data are drawn, and during a reading operation, the paper is fed with high accuracy by the guide holes of said guide sheet and deviation of the paper occurring upon feeding of ordinary reading paper such as a drawing sheet not having guide holes is prevented, thereby correcting distortion of the readout data caused when said carriage is moved and compensating for the gradient of the readout data.

10. An input scanner according to claim 9, which further comprises a paper holding member provided on said paper guide sheet such that the paper to be read is fed to be inclined at $\theta°$ with respect to the carriage moving direction during the reading operation, said angle $\theta$ being formed by a locus of the movement of paper and that of said carriage during the reading operation is $\theta°$.

11. An input scanner according to claim 5, wherein, assuming that a theoretical moving length of said carriage in a direction perpendicular to a paper feeding direction of said moving carriage is x when the paper is fed by length y during the reading operation, said carriage is guided and moved to be inclined at an angle of $\tan^{-1}(y/x)$ with respect to an axis perpendicular to a moving direction of the paper and along a paper feeding direction during the reading operation.

12. An input scanner according to claim 5, wherein, assuming that an angle formed by a moving locus of the paper and that of said carriage during the reading operation is $\theta°$, that a moving distance of said carriage from the first column to the readout column is l, and that a pitch between said reading sensors is d, readout data of each column is shifted in the moving direction of the paper by $n=(l\times\tan\theta)/d$, thereby compensating for the gradient of the readout data line with respect to a horizontal line.

* * * * *